United States Patent
Mizuno

(10) Patent No.: US 12,061,827 B2
(45) Date of Patent: Aug. 13, 2024

(54) PROCESSING SYSTEM, INFORMATION PROCESSING APPARATUS, AND MEDIUM FOR AUTHORIZED USAGE OF AN IMAGE PROCESSING APPARATUS

(71) Applicant: SEIKO EPSON CORPORATION, Tokyo (JP)

(72) Inventor: Satoshi Mizuno, Azumino (JP)

( * ) Notice: Subject to any disclaimer, the term of this patent is extended or adjusted under 35 U.S.C. 154(b) by 0 days.

(21) Appl. No.: 18/158,024

(22) Filed: Jan. 23, 2023

(65) Prior Publication Data

US 2023/0236777 A1 Jul. 27, 2023

(30) Foreign Application Priority Data

Jan. 24, 2022 (JP) .................................. 2022-008500

(51) Int. Cl.
*H04N 1/44* (2006.01)
*G06F 3/12* (2006.01)

(52) U.S. Cl.
CPC .......... *G06F 3/1222* (2013.01); *G06F 3/1238* (2013.01)

(58) Field of Classification Search
CPC ....... G06F 3/1222; G06F 3/1238; H04N 1/44; H04N 1/4413; H04N 1/442; H04N 1/4426
USPC ...................................................... 358/1.14
See application file for complete search history.

(56) References Cited

U.S. PATENT DOCUMENTS

| 8,089,341 | B2 * | 1/2012 | Nakagawa | G07C 9/27 340/5.23 |
| 8,176,550 | B2 * | 5/2012 | Kishi | G06F 21/31 713/168 |
| 2007/0078782 | A1 * | 4/2007 | Ono | G06Q 20/3674 705/67 |
| 2021/0037163 | A1 * | 2/2021 | Tanaka | G06V 40/166 |

FOREIGN PATENT DOCUMENTS

JP 2019142126 A 8/2019

* cited by examiner

*Primary Examiner* — Kent Yip
(74) *Attorney, Agent, or Firm* — Pramod Chintalapoodi

(57) ABSTRACT

A processing system that permits a user who is authenticated to use an image processing apparatus installed in a controlled area, the processing system includes an acquisition portion that acquires entrance permission/refusal information indicating whether or not there is entrance permission from a determination portion which determines, based on first authentication information acquired from the user, whether or not to permit entrance of the user to the controlled area, the entrance permission indicating that the entrance is permitted, and a processor that permits the user to use the image processing apparatus, when the entrance permission/refusal information indicates entrance permission and authentication is performed based on second authentication information acquired from the user in the controlled area.

11 Claims, 13 Drawing Sheets

PROCESSING SYSTEM, INFORMATION PROCESSING APPARATUS, AND MEDIUM FOR AUTHORIZED USAGE OF AN IMAGE PROCESSING APPARATUS

The present application is based on, and claims priority from JP Application Serial Number 2022-008500, filed Jan. 24, 2022, the disclosure of which is hereby incorporated by reference herein in its entirety.

BACKGROUND

1. Technical Field

The present disclosure relates to a processing system, an information processing apparatus, a non-transitory computer-readable storage medium storing a control program, and an image processing apparatus that permit an authenticated user to use the image processing apparatus.

2. Related Art

Before an image processing apparatus such as a multi-function machine performs image processing such as printing and reading of documents, a server or an image processing apparatus may perform user authentication such as authentication by an identification (ID) card, authentication by input operation of a user name and a password, or face authentication. For example, an image forming apparatus disclosed in JP-A-2019-142126 captures an image of a person existing in the surroundings, executes face authentication processing for the person by using a captured image, and executes a reserved print job of the authenticated user when the face authentication processing is successful.

In addition, an entrance/exit management system is in operation to manage whether or not to permit the entrance of a user to an office.

An unauthorized user can illegally use the image processing apparatus by succeeding in face authentication by using a face photo of an authorized user. In addition, the unauthorized user can succeed in authentication by illegally obtaining and using an ID card or can succeed in authentication by illegally obtaining and inputting a user name and a password.

SUMMARY

According to an aspect of the present disclosure, there is provided a processing system that permits a user who is authenticated to use an image processing apparatus installed in a controlled area, the processing system including an acquisition portion that acquires entrance permission/refusal information indicating whether or not there is entrance permission from a determination portion which determines, based on first authentication information acquired from the user, whether or not to permit entrance of the user to the controlled area, the entrance permission indicating that the entrance is permitted, and a processing portion that permits the user to use the image processing apparatus, when the entrance permission/refusal information indicates entrance permission and authentication is performed based on second authentication information acquired from the user in the controlled area.

In addition, according to an aspect of the present disclosure, there is provided an information processing apparatus that is coupled to an image processing apparatus installed in a controlled area and permits a user who is authenticated to use the image processing apparatus, the information processing apparatus including an acquisition portion that acquires entrance permission/refusal information indicating whether or not there is entrance permission from a determination portion which determines, based on first authentication information acquired from the user, whether or not to permit entrance of the user to the controlled area, the entrance permission indicating that the entrance is permitted, and a processing portion that permits the user to use the image processing apparatus, when the entrance permission/refusal information indicates entrance permission and authentication is performed based on second authentication information acquired from the user in the controlled area.

Furthermore, according to an aspect of the present disclosure, there is provided a non-transitory computer-readable storage medium storing a control program for permitting a user who is authenticated to use an image processing apparatus installed in a controlled area, the control program causing a computer to realize an acquisition function of acquiring entrance permission/refusal information indicating whether or not there is entrance permission from a determination portion which determines, based on first authentication information acquired from the user, whether or not to permit entrance of the user to the controlled area, the entrance permission indicating that the entrance is permitted, and a processing function of permitting the user to use the image processing apparatus, when the entrance permission/refusal information indicates entrance permission and authentication is performed based on second authentication information acquired from the user in the controlled area.

Furthermore, according to an aspect of the present disclosure, there is provided an image processing apparatus that is installed in a controlled area and permits use of a user who is authenticated, the image processing apparatus including an acquisition portion that acquires entrance permission/refusal information indicating whether or not there is entrance permission from a determination portion which determines, based on first authentication information acquired from the user, whether or not to permit entrance of the user to the controlled area, the entrance permission indicating that the entrance is permitted, and a processing portion that permits the user to use the image processing apparatus, when the entrance permission/refusal information indicates entrance permission and authentication is performed based on second authentication information acquired from the user in the controlled area.

DESCRIPTION OF EXEMPLARY EMBODIMENTS

Figure 1:
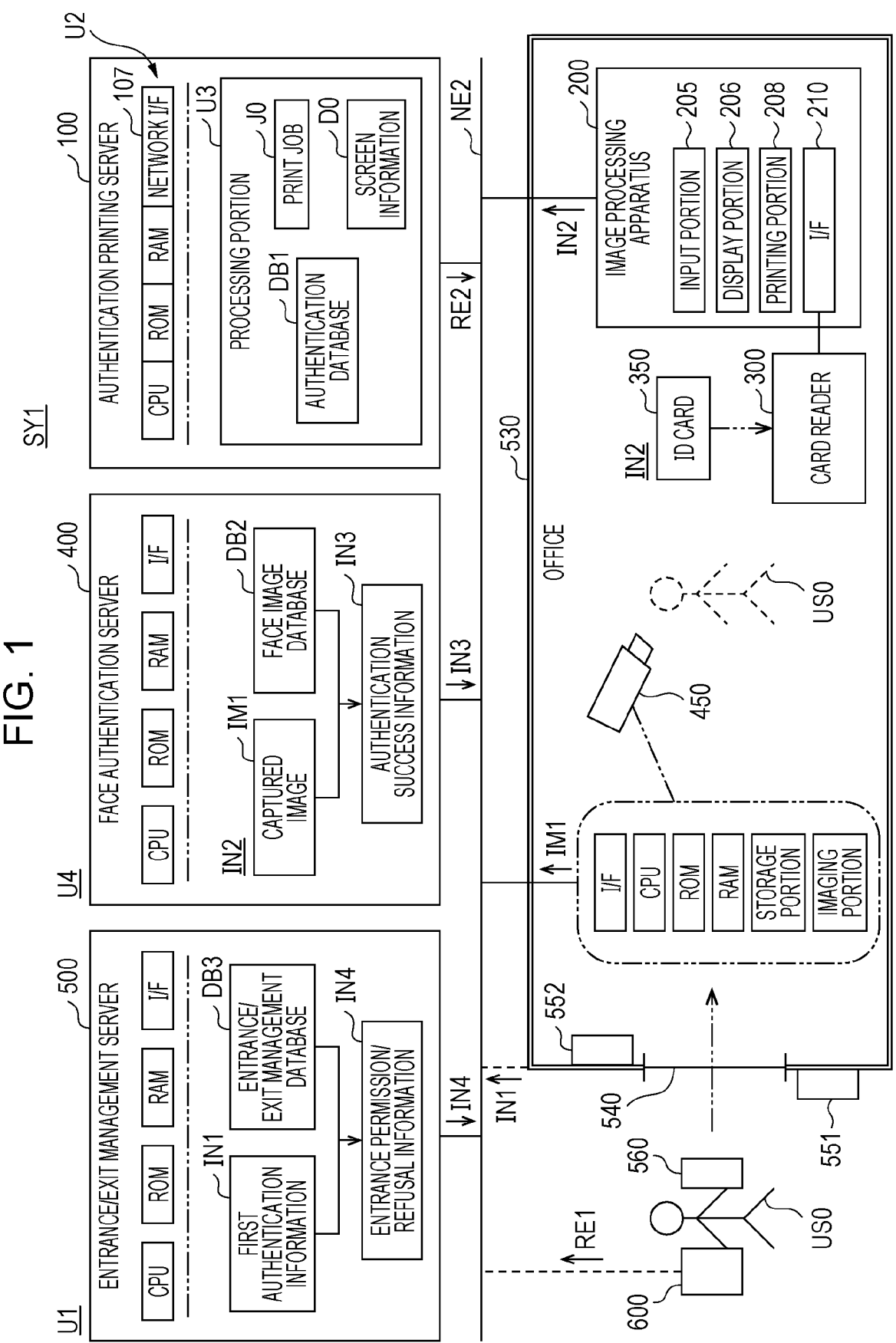
FIG. 1 is a block diagram schematically illustrating a configuration example of a system including a processing system.

Hereinafter, embodiments of the present disclosure will be described. As a matter of course, the following embodiments merely illustrate the present disclosure, and not all features illustrated in the embodiments are essential to solution units of the disclosure.

(1) Overview of Technique Included in Present Disclosure

First, an overview of a technique included in the present disclosure will be described with reference to examples illustrated in FIGS. 1 to 14. The figures of the present application are diagrams schematically illustrating the examples, and the magnification in each direction illustrated in these figures may be different and the figures may not be consistent. As a matter of course, each element of the present technique is not limited to specific examples indicated by reference numerals. In the "overview of the technique included in the present disclosure", the words in parentheses mean supplementary explanations of the immediately preceding words.

Figure 11:
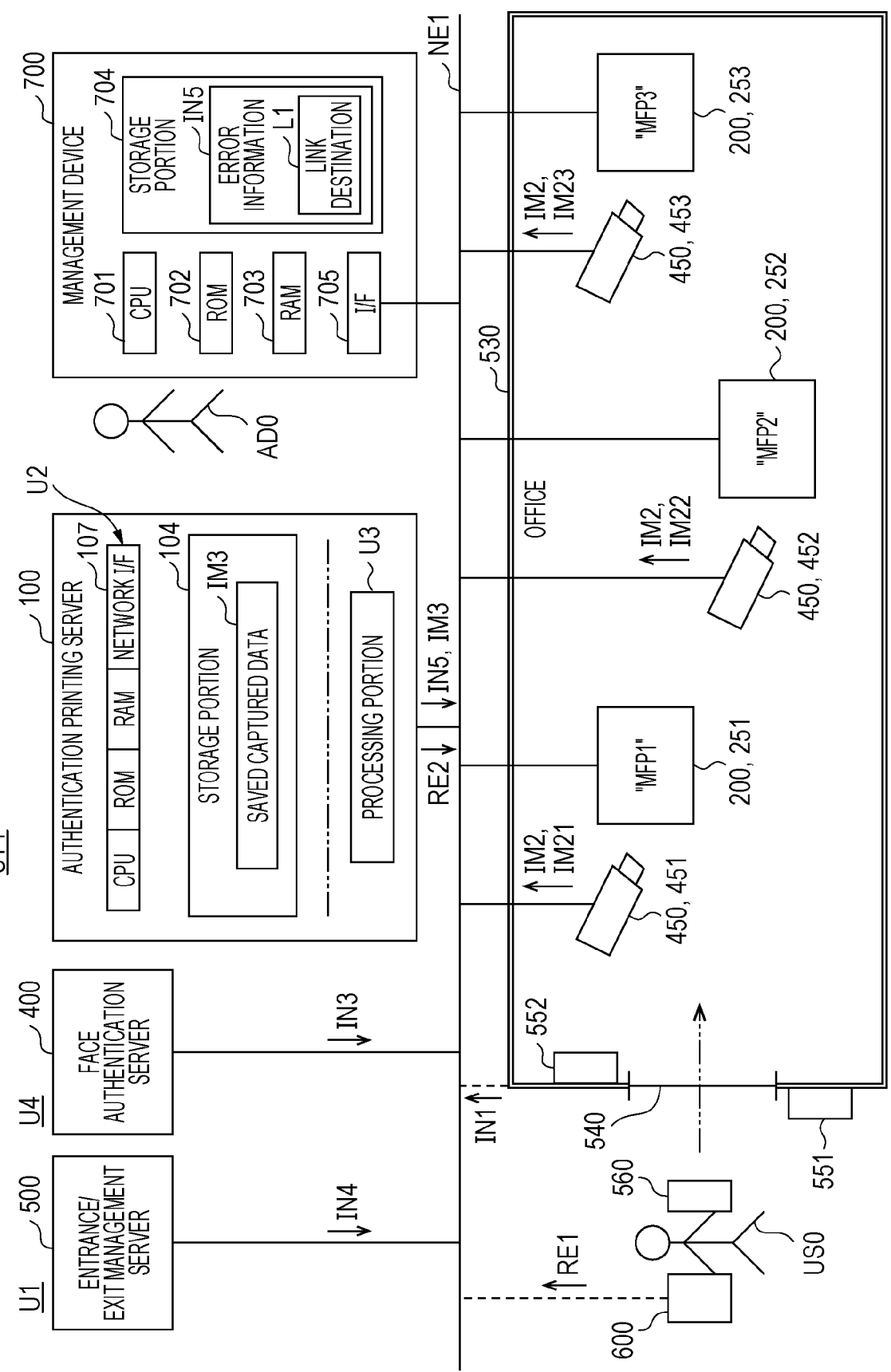
FIG. 11 is a block diagram schematically illustrating another configuration example of the system including the processing system.
Figure 14:
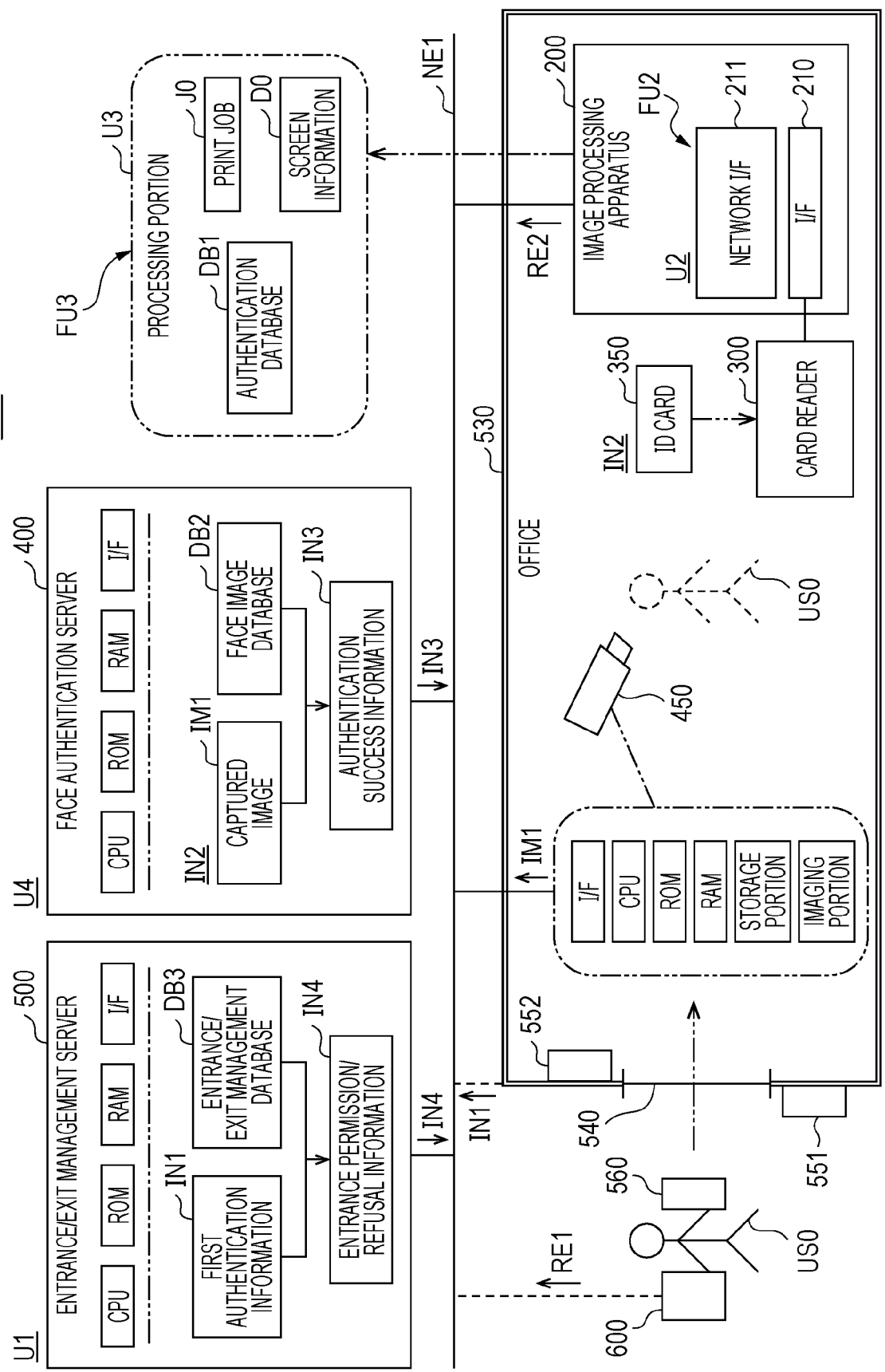
FIG. 14 is a block diagram schematically illustrating another configuration example of the system including the processing system.

Aspect 1:

As illustrated in FIGS. 1, 11, and 14, a processing system SY1 according to an aspect of the present technique is the processing system SY1 that permits an authenticated user US0 to use an image processing apparatus 200 installed in a controlled area (for example, office 530), and includes an acquisition portion U2 and a processing portion U3. The acquisition portion U2 acquires entrance permission/refusal information IN4 indicating whether or not there is entrance permission from a determination portion U1 that determines, based on first authentication information IN1 acquired from the user US0, whether or not to permit entrance of the user US0 to the controlled area (for example, office 530), the entrance permission indicating that the entrance is permitted. The processing portion U3 permits the user US0 to use the image processing apparatus 200, when the entrance permission/refusal information IN4 indicates entrance permission, and authentication is performed based on second authentication information IN2 acquired from the user US0 in the controlled area (530).

When the user US0 enters the controlled area (530) where the image processing apparatus 200 is installed, the determination portion U1 determines whether or not to permit the user US0 to enter the controlled area (530) based on the first authentication information IN1 acquired from the user US0. The determination portion U1 can generate entrance permission/refusal information IN4 indicating whether or not there is entrance permission based on the determination. The entrance permission/refusal information IN4 indicates entrance permission when the user US0 has entered the controlled area (530), and indicates entrance refusal when the user US0 has exited the controlled area (530).

The authorized user is permitted to use the image processing apparatus 200 when entering the controlled area (530) and succeeding in authentication based on the second authentication information IN2. On the other hand, when the authorized user has exited the controlled area (530), since the use of the image processing apparatus 200 is not permitted, the unauthorized user in the controlled area (530) cannot impersonate an authorized user and cannot illegally use the image processing apparatus 200. Therefore, illegal actions such as an unauthorized user impersonating an authorized user who is not in the controlled area (530) and illegally logging in are suppressed. Therefore, Aspect 1 above can provide the processing system SY1 that enhances the effect of suppressing unauthorized use of the image processing apparatus 200.

Here, the image processing apparatus 200 includes a multifunction machine, a printer, a scanner, and the like. The multifunction machine means an image processing apparatus having two or more functions of a plurality of functions including a printing function, a document reading function, a copying function, a facsimile function, and the like.

The processing system SY1 may include the determination portion U1 or may not include the determination portion U1. In addition, the processing system SY1 may include an authentication portion U4 that performs authentication based on the second authentication information IN2, or may not include the authentication portion U4. As a matter of course, an information processing apparatus (for example, authentication printing server 100) including the authentication portion U4 may include the determination portion U1, or may not include the determination portion U1.

The second authentication information IN2 may be the same information as the first authentication information IN1, or may be information different from the first authentication information IN1.

Authentication based on the second authentication information IN2 includes biometric authentication, authentication by an ID card, authentication by input operation of a user name and a password, and the like. The biometric authentication includes face authentication based on a captured image of the face of the user US0, iris authentication based on a captured image of the iris of the user US0, fingerprint authentication, and the like. Therefore, the second authentication information IN2 includes the captured image of the face, the captured image of the iris, the ID recorded on the ID card, the user name and the password, and the like.

Various processing of the processing portion U3 are considered. For example, the processing portion U3 may cause the acquisition portion U2 to acquire the entrance permission/refusal information IN4 using the fact that the authentication is performed based on the second authentication information IN2 as a trigger, and permit to use the image processing apparatus 200 when the entrance permission/refusal information IN4 indicates the entrance permission. In addition, the processing portion U3 may ignore the authentication based on the second authentication information IN2 when the entrance permission/refusal information IN4 indicates the entrance refusal rather than the entrance permission.

"First", "second", . . . in the present application are terms for identifying each component included in a plurality of components having similarities, and do not mean the order.

The additional remark described above also applies to the following aspects.

Figure 4:
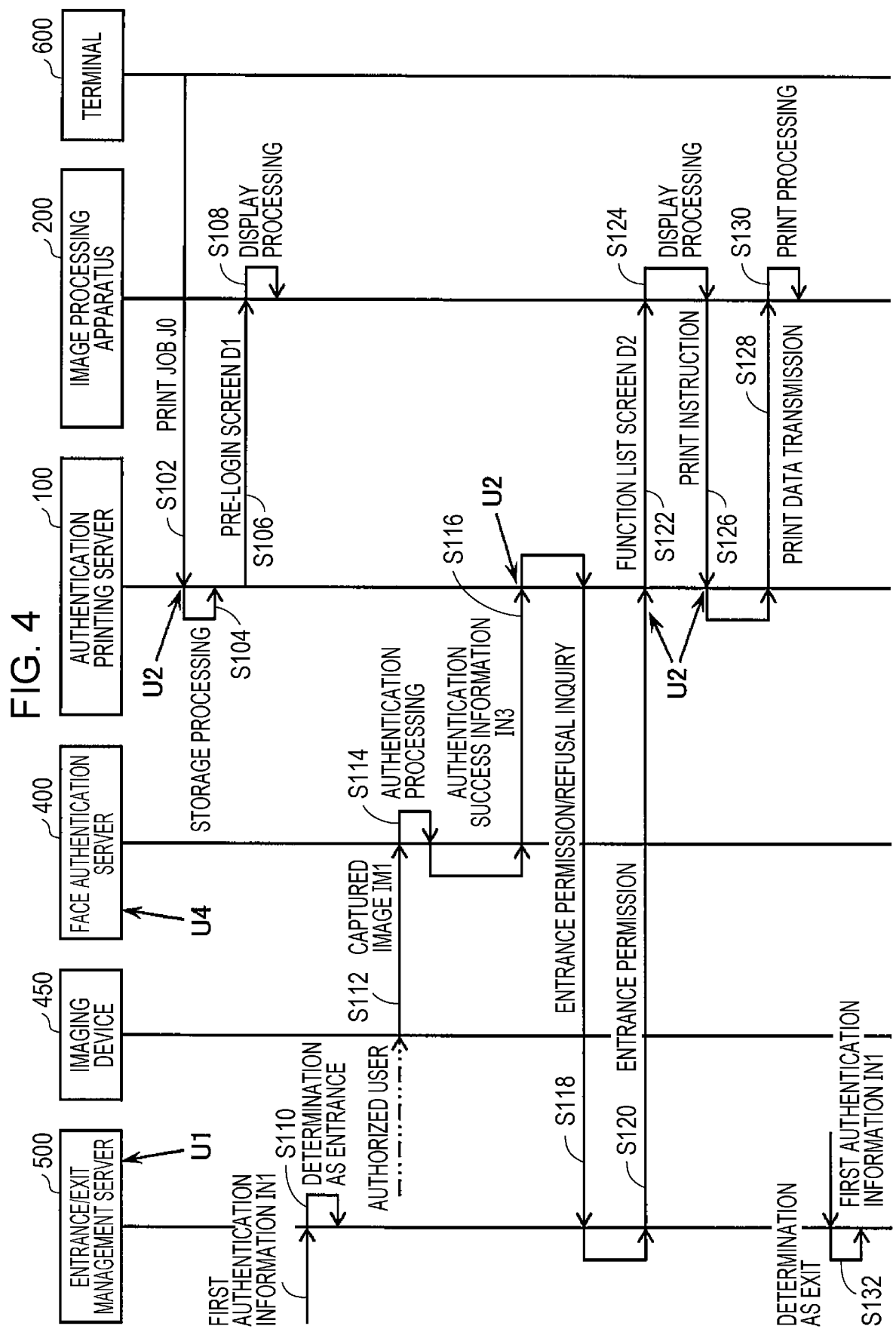
FIG. 4 is a diagram schematically illustrating an example of a flow of processing performed by the processing system when face authentication is performed for an authorized user who has entered a controlled area.
Figure 8:
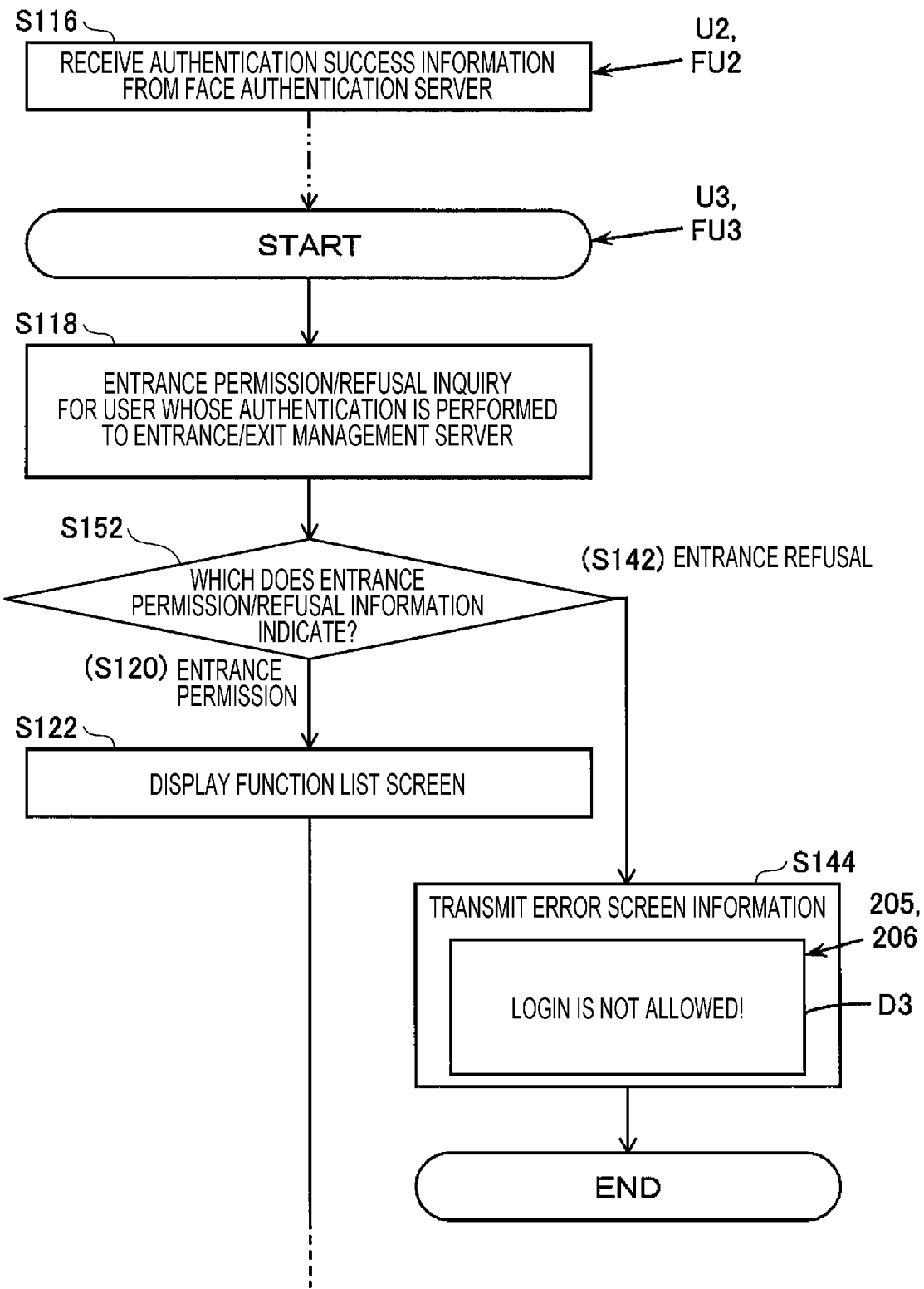
FIG. 8 is a flowchart schematically illustrating an example of processing performed by a processing portion when face authentication is performed.

Aspect 2:

As illustrated in FIG. 4 and the like, the acquisition portion U2 may be configured to acquire authentication success information IN3 indicating that the authentication is performed from the authentication portion U4 that performs authentication based on the second authentication information IN2 acquired from the user US0 in the controlled area (530). As illustrated in FIG. 8 and the like, when the entrance permission/refusal information IN4 indicates entrance permission and the authentication success information IN3 is acquired, the processing portion U3 may permit the user US0 to use the image processing apparatus 200.

Aspect 2 above can provide a suitable processing system SY1 that enhances the effect of suppressing unauthorized use of the image processing apparatus 200.

Figure 9:
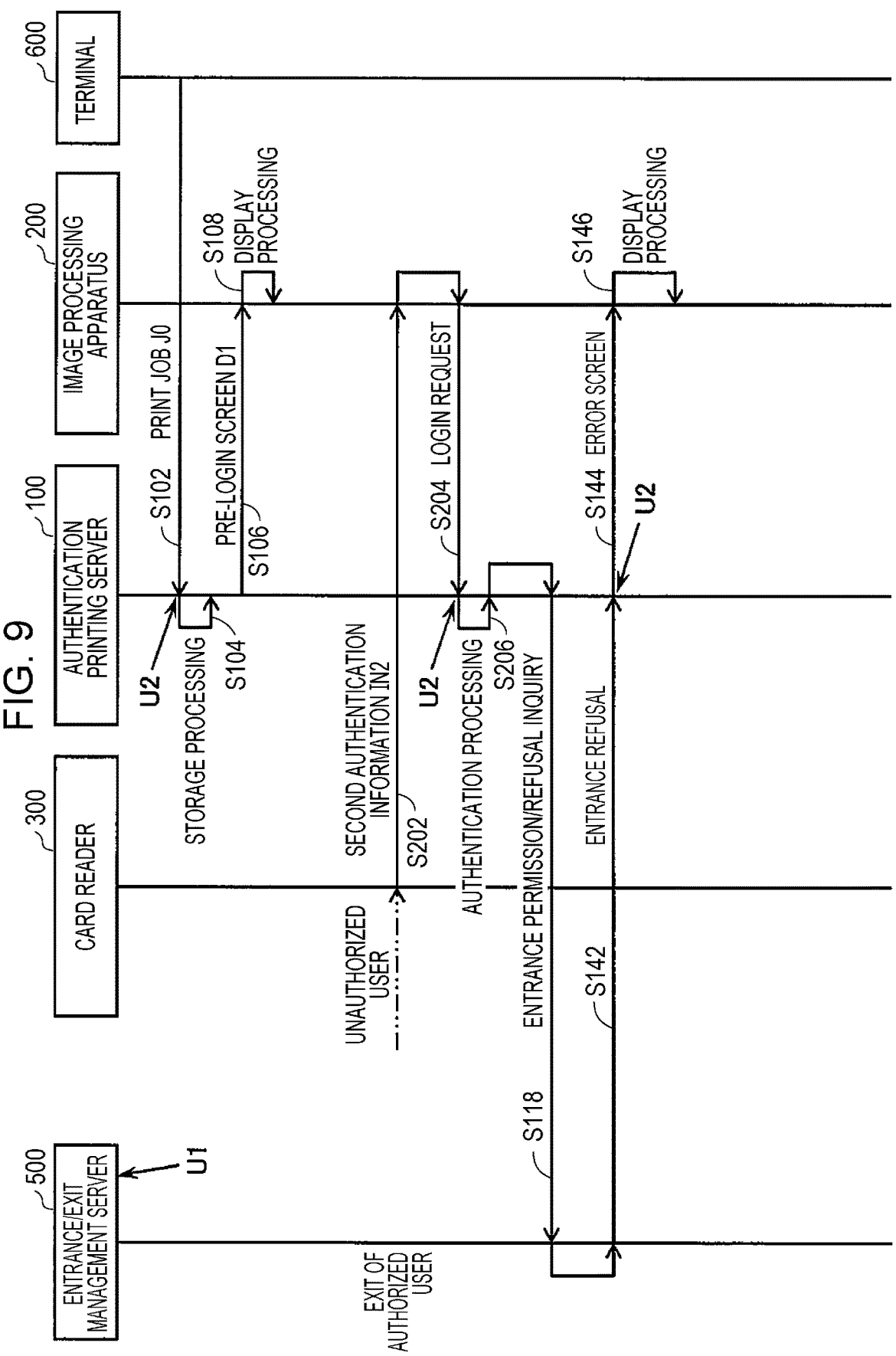
FIG. 9 is a diagram schematically illustrating an example of a flow of processing performed by the processing system when card authentication is performed for an unauthorized user who is outside the controlled area and is trying to impersonate an authorized user.
Figure 10:
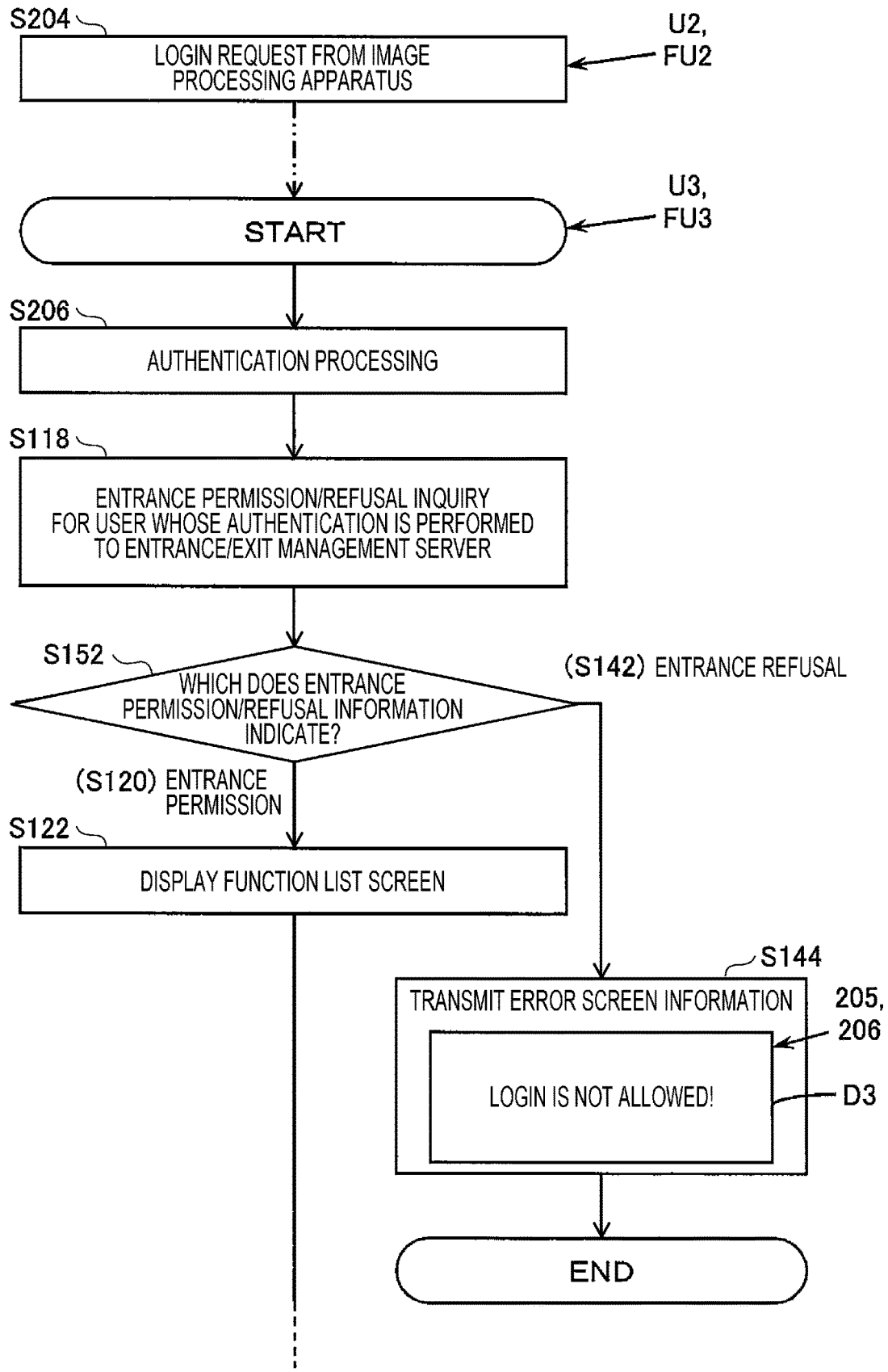
FIG. 10 is a flowchart schematically illustrating an example of processing performed by the processing portion when card authentication is performed.

Aspect 3:

As illustrated in FIG. 9 and the like, the acquisition portion U2 may acquire the second authentication information IN2 from the user US0 in the controlled area (530). As illustrated in FIG. 10, when the entrance permission/refusal information IN4 indicates entrance permission and authentication is performed based on the second authentication information IN2 acquired by the acquisition portion U2, the processing portion U3 may permit the user US0 to use the image processing apparatus 200.

Aspect 3 above can also provide a suitable processing system SY1 that enhances the effect of suppressing unauthorized use of the image processing apparatus 200.

Figure 12:
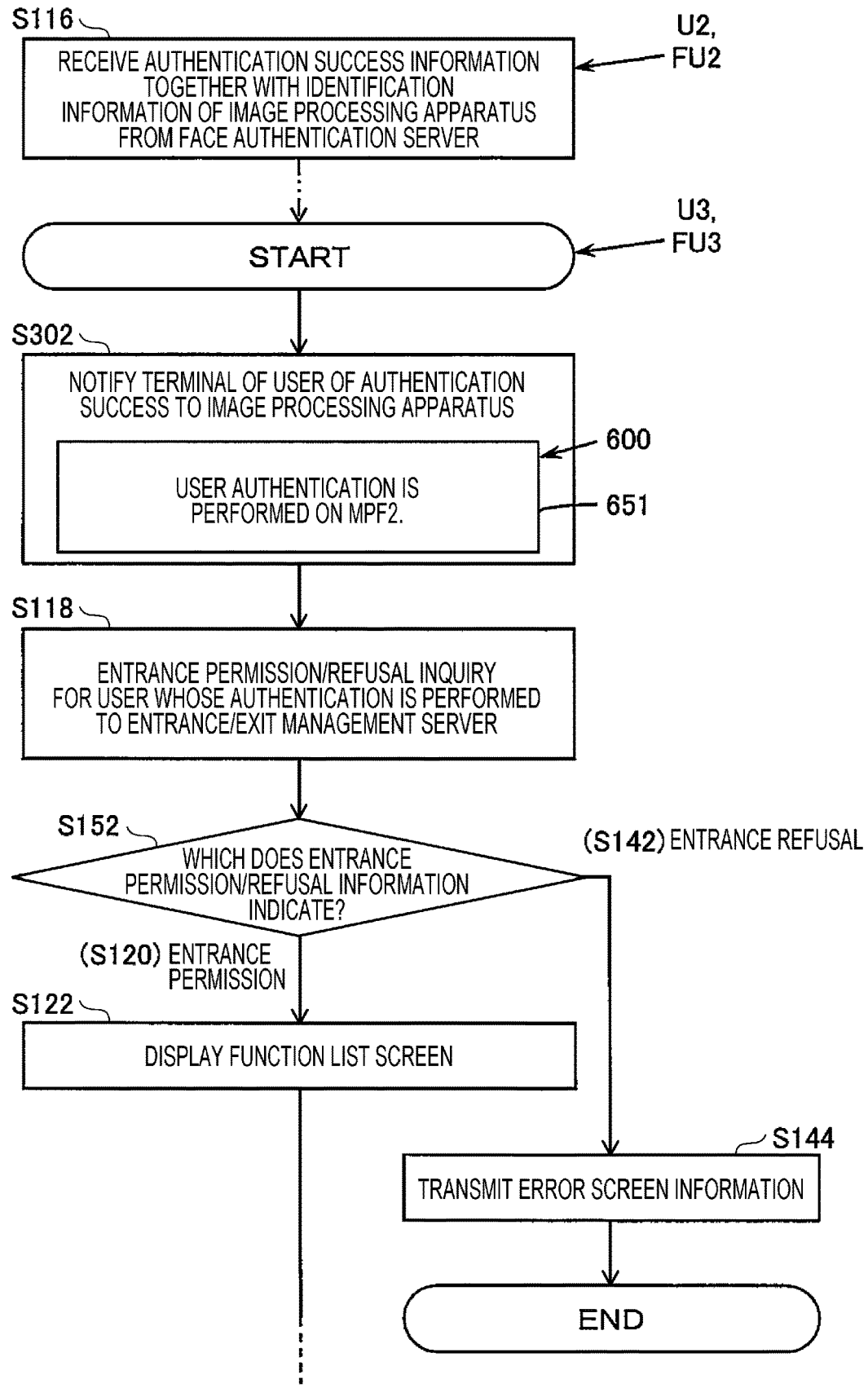
FIG. 12 is a flowchart schematically illustrating another processing example performed by the processing portion when face authentication is performed.

Aspect 4:

As illustrated in FIG. 12, when authentication is performed based on the second authentication information IN2, the processing portion U3 may perform processing (for example, display of notification screen 651) of notifying a terminal 600 that receives the operation by the user US0 that the authentication is performed based on the second authentication information IN2.

In the above case, regardless of whether the authorized user has entered the controlled area (530) or not, when the authorized user is notified that authentication is performed based on the second authentication information IN2 while the authorized user is not performing a login action, the authorized user can obtain the possibility of unauthorized login. As a result, it is possible to check the unauthorized user. Therefore, Aspect 4 above can further enhance the effect of suppressing unauthorized use of the image processing apparatus 200.

Figure 13:
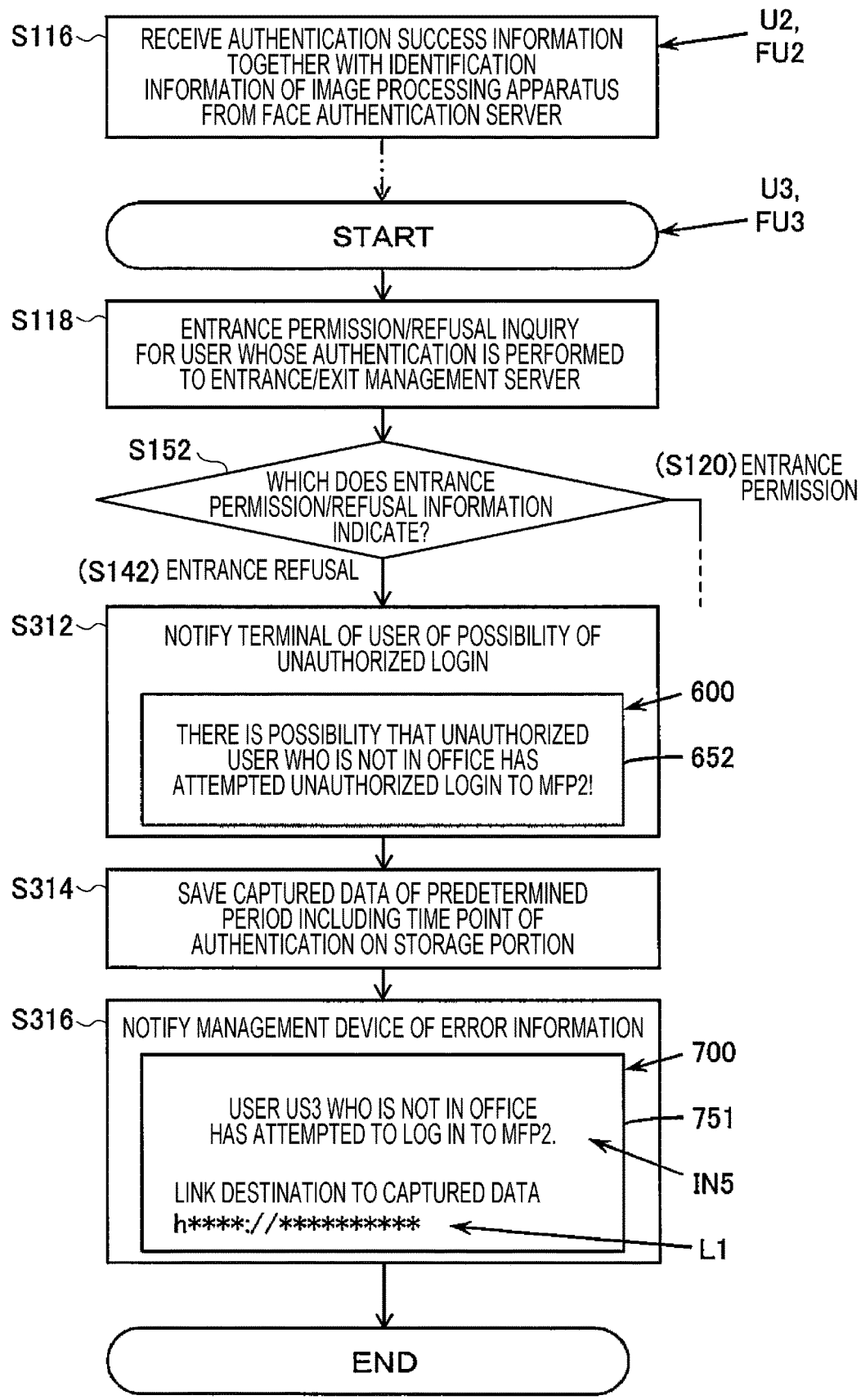
FIG. 13 is a flowchart schematically illustrating another processing example performed by the processing portion when face authentication is performed.

Aspect 5:

As illustrated in FIG. 13, when the entrance permission/refusal information IN4 indicates entrance refusal rather than entrance permission and authentication is performed based on the second authentication information IN2, the processing portion U3 may perform processing (for example, display of notification screen 652) of notifying a terminal 600 that receives the operation by the user US0 of the possibility of unauthorized login.

When authentication is performed for the user US0 who is not permitted to enter the controlled area (530) based on the second authentication information IN2, a possibility of unauthorized login is considered. Since the authorized user can obtain the possibility of such unauthorized login, the unauthorized user can be checked. Therefore, Aspect 5 above can further enhance the effect of suppressing unauthorized use of the image processing apparatus 200.

Aspect 6:

As illustrated in FIG. 13, when the entrance permission/refusal information IN4 indicates entrance refusal rather than entrance permission, and authentication is performed based on the second authentication information IN2, the processing portion U3 may perform processing (for example, display of notification screen 751) of notifying a management device 700 that receives the operation by the administrator AD0 of error information IN5.

When authentication is performed for the user US0 who is not permitted to enter the controlled area (530) based on the second authentication information IN2, a possibility of unauthorized login is considered. In such a case, since the error information IN5 is notified to the administrator AD0, unauthorized users can be checked. Therefore, Aspect 6 above can further enhance the effect of suppressing unauthorized use of the image processing apparatus 200.

Aspect 7:

As illustrated in FIG. 13, when the entrance permission/refusal information IN4 indicates entrance refusal rather than entrance permission, and authentication is performed based on the second authentication information IN2, the processing portion U3 may save, on a storage portion (for example, storage portion 104) in a readable manner, data of a predetermined period including the time point when the authentication is performed (for example, saved captured data IM3 illustrated in FIG. 11) among captured data IM2 acquired from the imaging device 450 that continuously captures images of the user US0 who is a target of which the second authentication information IN2 is to be acquired.

When authentication is performed for the user US0 who is not permitted to enter the controlled area (530) based on the second authentication information IN2, a possibility of unauthorized login is considered. In such a case, since the captured data of the user US0 is saved on the storage portion, unauthorized users can be checked. Therefore, Aspect 7 above can further enhance the effect of suppressing unauthorized use of the image processing apparatus 200.

Here, the captured data includes data of moving images, data of continuously captured images, and the like. The additional remark also applies to the following aspects.

Aspect 8:

As illustrated in FIG. 1 and the like, the processing portion U3 may cause the image processing apparatus 200 to execute image processing via the network NE1.

Aspect 8 above can perform advanced processing in an information processing apparatus network-connected to the image processing apparatus 200, and thus can provide a suitable example of the processing system SY1.

Here, the image processing includes processing such as printing, document reading, document copying, facsimile communication, and the like. The additional remark also applies to the following aspects.

Aspect 9:

As illustrated in FIG. 14, the acquisition portion U2 and the processing portion U3 may be included in the image processing apparatus 200.

Aspect 9 above can provide a processing system SY1 that does not require a server that manages the image processing apparatus 200.

Figure 2:
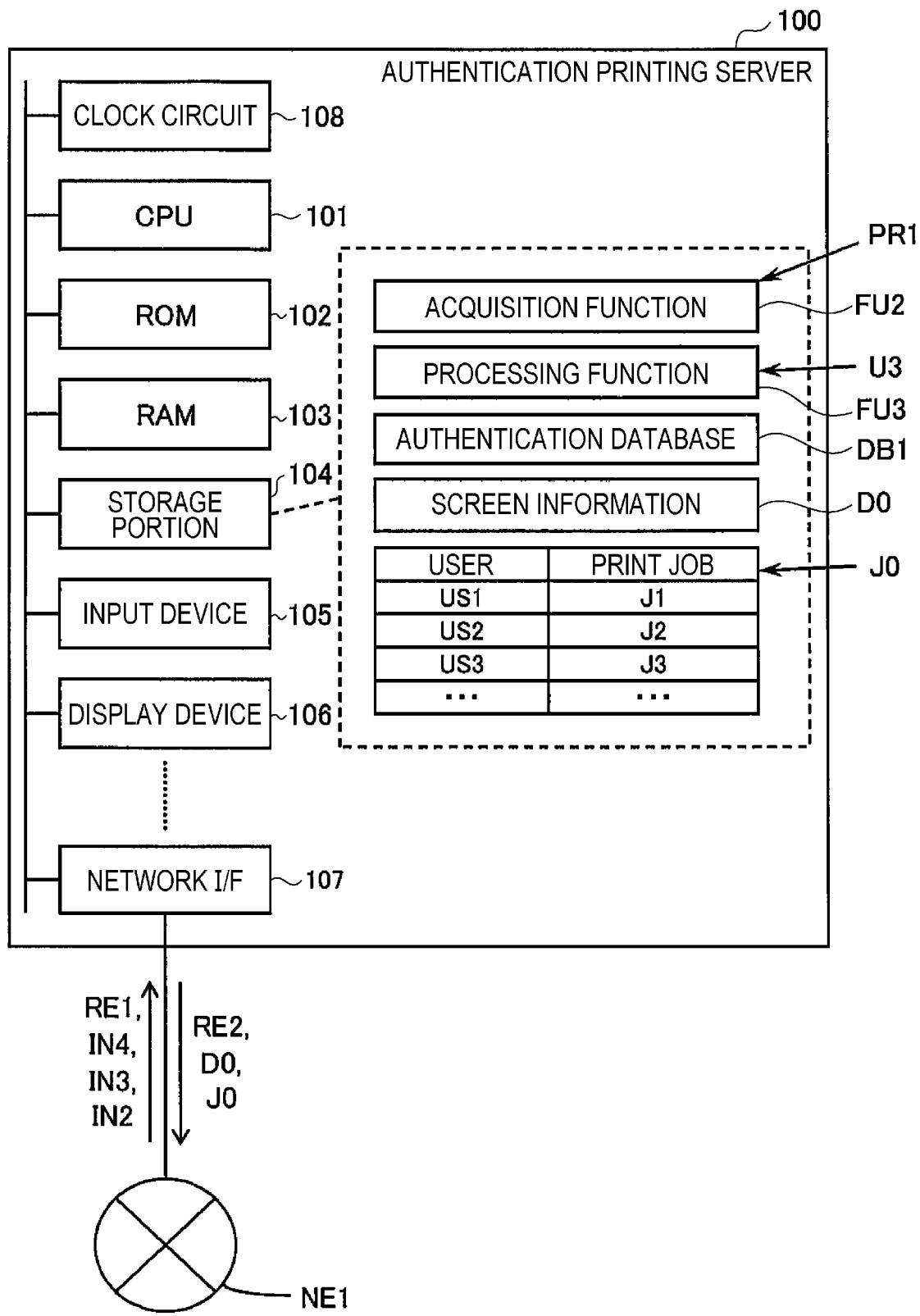
FIG. 2 is a block diagram schematically illustrating a configuration example of an information processing apparatus.

Aspect 10:

Incidentally, as illustrated in FIGS. 1, 2, and 11, the information processing apparatus (100) according to an aspect of the present technique is the information processing apparatus (100) coupled to the image processing apparatus 200 installed in the controlled area (530), is the information processing apparatus (100) that permits the authenticated user US0 to use the image processing apparatus 200, and includes the acquisition portion U2 and the processing portion U3. The acquisition portion U2 acquires entrance permission/refusal information IN4 indicating whether or not there is entrance permission from a determination portion U1 that determines, based on first authentication information IN1 acquired from the user US0, whether or not to permit entrance of the user US0 to the controlled area (530), the entrance permission indicating that the entrance is permitted. The processing portion U3 permits the user US0 to use the image processing apparatus 200, when the entrance permission/refusal information IN4 indicates entrance permission, and authentication is performed based on second authentication information IN2 acquired from the user US0 in the controlled area (530).

Aspect 10 above can provide the information processing apparatus (100) that enhances the effect of suppressing unauthorized use of the image processing apparatus 200.

Aspect 11:

In addition, as illustrated in FIGS. 2 and 14, the control program PR1 according to an aspect of the present technique is the control program PR1 for permitting the authenticated user US0 to use the image processing apparatus 200 installed in the controlled area (530), and causes the computer to realize an acquisition function FU2 and a processing function FU3. The acquisition function FU2 acquires entrance permission/refusal information IN4 indicating whether or not there is entrance permission from a determination portion U1 that determines, based on first authentication information IN1 acquired from the user US0, whether or not to permit entrance of the user US0 to the controlled area (530), the entrance permission indicating that the entrance is permitted. The processing function FU3 permits the user US0 to use the image processing apparatus 200, when the entrance permission/refusal information IN4 indicates entrance permission, and authentication is performed based on second authentication information IN2 acquired from the user US0 in the controlled area (530).

Aspect 11 above can provide the control program PR1 for enhancing the effect of suppressing unauthorized use of the image processing apparatus 200.

Aspect 12:

Furthermore, as illustrated in FIG. 14, the image processing apparatus 200 according to an aspect of the present technique is the image processing apparatus 200 installed in the controlled area (530), is the image processing apparatus 200 that permits use of the authenticated user US0, and includes the acquisition portion U2 and the processing portion U3. The acquisition portion U2 acquires entrance permission/refusal information IN4 indicating whether or not there is entrance permission from a determination portion U1 that determines, based on first authentication information IN1 acquired from the user US0, whether or not to permit entrance of the user US0 to the controlled area (530), the entrance permission indicating that the entrance is permitted. The processing portion U3 permits the user US0 to use the image processing apparatus 200, when the entrance permission/refusal information IN4 indicates entrance permission, and authentication is performed based on second authentication information IN2 acquired from the user US0 in the controlled area (530).

Aspect 12 above can provide the image processing apparatus 200 that enhances the effect of suppressing unauthorized use of the image processing apparatus 200.

Furthermore, the present technique can be applied to a complex system including the processing system SY1, a complex apparatus including the information processing apparatus (100), an image processing system including the image processing apparatus 200, a processing method performed by the processing system SY1, an information processing method performed by the information processing apparatus (100), a processing method performed by the image processing apparatus 200, a control method of the image processing apparatus 200, a computer-readable medium recording the control program PR1, and the like. Any of the apparatuses described above may be configured to include a plurality of distributed parts.

(2) Specific Example of Configuration of Processing System

FIG. 1 schematically illustrates the configuration of a system including a processing system SY1 as a specific example. The system includes an authentication printing server 100, an image processing apparatus 200, a card reader 300, a face authentication server 400, an imaging device 450, an entrance/exit management server 500, and a terminal 600. Here, the authentication printing server 100 is an example of an information processing apparatus, the face authentication server 400 is an example of the authentication portion U4, and the entrance/exit management server 500 is an example of the determination portion U1. The processing system SY1 includes an authentication printing server 100, an image processing apparatus 200, and a card reader 300. The processing system SY1 may include the terminal 600, may include the face authentication server 400, may include the imaging device 450, and may include the entrance/exit management server 500. The authentication printing server 100, the image processing apparatus 200, the face authentication server 400, the imaging device 450, the entrance/exit management server 500, and the terminal 600 are connected to a network NE1 including the Internet. The network NE1 may include a LAN. Here, LAN is an abbreviation for Local Area Network. The connection to the network NE1 may be a wired connection, a wireless connection, or both a wired and wireless connection.

The image processing apparatus 200, the card reader 300, and the imaging device 450 are installed in an office 530, which is an example of a controlled area. The entrance/exit of the user US0 to/from the office 530 is managed by an entrance/exit management system including the entrance/exit management server 500. In addition to the entrance/exit management server 500, the entrance/exit management system includes an entrance/exit 540 equipped with an automatic door, an outdoor reader 551 installed outside the office 530, and an indoor reader 552 installed inside the office 530.

The user US0 who is allowed to enter the office 530 is allowed to possess an ID holder 560 which readably holds the first authentication information IN1 including information identifying the user US0. The ID holder 560 includes an ID card recording the first authentication information IN1 in a computer-readable manner, and a smartphone storing the first authentication information IN1, and the like. An IC card, a magnetic card, a card printed with an identification code including the first authentication information IN1, or the like can be used as the ID card. Here, IC is an abbreviation for Integrated Circuit. The identification codes include barcodes, two-dimensional codes, and the like.

In the above case, the outdoor reader 551 and the indoor reader 552 include IC card readers, magnetic card readers, identification code readers, and the like.

The user US0 outside the office 530 can enter the office 530 by opening the entrance/exit 540 when the outdoor reader 551 reads the first authentication information IN1 of the ID holder 560 possessed by the user. The user US0 in the office 530 can exit the office 530 by opening the entrance/exit 540 when the indoor reader 552 reads the first authentication information IN1 of the ID holder 560 possessed by the user.

The entrance/exit management server 500 is a server computer including a CPU, a ROM, a RAM, a storage portion (not illustrated), an I/F for connecting to the network NE1, and the like. Here, CPU is an abbreviation for Central Processing Unit, ROM is an abbreviation for Read Only Memory, RAM is an abbreviation for Random Access Memory, and I/F is an abbreviation for Interface. The storage portion of the entrance/exit management server 500 stores an entrance/exit management database DB3 accumulating information that can permit authentication. When the first authentication information IN1 received from the outdoor reader 551 via the network NE1 is registered in the entrance/exit management database DB3, the entrance/exit management server 500 allows the entrance/exit 540 to be opened and permits the entrance of the user US0. At this time, the entrance/exit management server 500 determines that the user US0 has entered the office 530. In addition, when the first authentication information IN1 received from the indoor reader 552 via the network NE1 is registered in the entrance/exit management database DB3, the entrance/exit management server 500 allows the entrance/exit 540 to be opened and permits the exit of the user US0. At this time, the entrance/exit management server 500 determines that the user US0 has exited the office 530.

As described above, the entrance/exit management server 500 determines whether or not to permit the user US0 to enter the office 530 based on the first authentication information IN1 acquired from the user US0.

Furthermore, when the entrance permission/refusal inquiry RE2 for the user US0 is received from the authentication printing server 100, the entrance/exit management server 500 generates entrance permission/refusal information IN4 indicating whether or not there is entrance permission in which entrance of the user US0 is permitted, and transmits the information to the authentication printing server 100. The entrance/exit management server 500 generates entrance permission/refusal information IN4 indicating entrance permission until it is determined that the user US0 has exited the office 530 after it is determined that the user has entered the office 530. In addition, the entrance/exit management server 500 generates entrance permission/refusal information IN4 indicating the entrance refusal rather than the entrance permission until it is determined that the user US0 has entered the office 530 after it is determined that the user has exited the office 530.

The entrance/exit management server 500 may perform biometric authentication such as face authentication, iris authentication, fingerprint authentication, and the like instead of authentication using the ID holder 560. When the entrance/exit management server 500 performs face authentication, an outdoor camera can be used instead of the outdoor reader 551 and an indoor camera can be used instead of the indoor reader 552.

In addition, the controlled area is not limited to the room itself, and may be a partitioned area of the room, a partitioned area including a corridor, or the like.

The user US0 who is allowed to enter the office 530 can register a print job J0 in the authentication printing server 100 by using the terminal 600 having a CPU, a ROM, a RAM, a storage portion, an I/F for connecting to the network NE1, and the like. The terminal 600 includes a computer such as a personal computer including a tablet terminal, a mobile phone such as a smart phone, and the like. When face authentication, card authentication, or authentication by input operation of a user name and a password is succeeded, the user US0 who has registered the print job J0 in the authentication printing server 100 can cause the image processing apparatus 200 to execute printing based on the registered print job J0. The face authentication is performed when the user US0 faces the face to the imaging device 450. The card authentication is performed by holding the ID card 350 over the card reader 300. In addition, the authenticated user US0 can cause the image processing apparatus 200 to execute image processing such as copying, facsimile communication, and document reading.

The combination of the image processing apparatus 200, the card reader 300, and the imaging device 450 is not limited to one existing in the processing system SY1, and two or more combinations may exist in the processing system SY1. In addition, two or more terminals 600 may exist in the processing system SY1.

The face authentication server 400 is a server computer including a CPU, a ROM, a RAM, a storage portion (not illustrated), an I/F for connecting to the network NE1, and the like. The storage portion of the face authentication server 400 stores a face image database DB2 in which the feature amounts of the face images of the user US0 that can permit authentication are associated with the user US0 and accumulated.

The face authentication processing is performed by determining the validity of a person to be authenticated based on the result of comparison between the feature amount of the face image registered in advance and the feature amount of the face image of the person to be authenticated at the time of authentication. Various processing are considered for the face authentication processing. For example, as the face authentication processing, the face authentication server 400 may detect the facial part of each of the captured face image of the user US0 and the registered face image, detect each facial feature point based on the detected facial part, and calculate a degree of similarity of the facial parts based on the detected facial feature point. When the calculated degree of similarity is greater than a predetermined threshold, it is determined that the user US0 in the captured face image and the person in the registered face image are the same person.

For example, the facial part can be detected by using a method of discriminating between a face and a non-face using a support vector machine for each of the captured face image of the user US0 and the registered face image. In addition, the facial part can also be detected by using a method for discriminating between a face and a non-face by a method of a deep neural network, a general learning vector quantization method, or the like.

For example, the facial feature point can be detected by a method of extracting feature points such as the eyes, nose, mouth, and the like from a facial part, calculating the positional relationship of the feature points and predetermined characteristics in the vicinity of the feature points as feature amounts, and creating feature amount vectors. Here, the predetermined characteristics include shade of color, distribution of color, and the like. As a matter of course, facial feature points can also be detected by other methods.

For example, calculation of the degree of similarity of facial parts can be realized by a method of calculating a chi-square distance, a Euclidean distance, or the like between feature amount vectors for each of the captured face image of the user and the registered face image. As a matter of course, the degree of similarity of facial parts can also be calculated by other methods.

When a feature amount having a degree of similarity to the feature amount of the face image included in the captured image IM1 received from the imaging device 450 via the network NE1 greater than a threshold is registered in the face image database DB2, the face authentication server 400 generates authentication success information IN3 including information identifying user US0. The captured image IM1 of the face of the user US0 is an example of the second authentication information IN2 obtained by detecting the user US0 without contact. The authentication success information IN3 indicates that authentication is performed based on the second authentication information IN2. When face authentication is performed and authentication success information IN3 is generated, the face authentication server 400 transmits the authentication success information IN3 to the authentication printing server 100 via the network NE1. When a feature amount having a degree of similarity to the feature amount of the face image included in the captured image IM1 greater than a threshold is not registered in the face image database DB2, the face authentication server 400 may transmit authentication failure information to the authentication printing server 100 indicating that face authentication has not been performed.

As described above, the face authentication server 400 performs authentication based on the second authentication information IN2 acquired from the user US0 in the office 530.

The imaging device 450 illustrated in FIG. 1 is a network camera that functions as a web server, and is provided with a CPU, a ROM, a RAM, a storage portion, an imaging portion, an I/F for connecting to the network NE1, and the like. Therefore, the imaging device 450 can also be said to be a server computer. When the face of the user US0 is captured without contact, the imaging device 450 transmits the captured image IM1 to the face authentication server 400 via the network NE1. The imaging device 450 may be directly coupled to the face authentication server 400 instead of the network camera.

The authentication printing server 100 is a server computer including the acquisition portion U2 that acquires the entrance permission/refusal information IN4, the authentication success information IN3, and the second authentication information IN2, and the processing portion U3 that permits the user US0 to use the image processing apparatus 200. The acquisition portion U2 can acquire the entrance permission/refusal information IN4 from the entrance/exit management server 500, and can acquire the authentication success information IN3 from the face authentication server 400. In addition, the acquisition portion U2 can acquire the second authentication information IN2 including information for identifying the user US0 from the user US0 in the office 530 via the image processing apparatus 200. The processing portion U3 has an authentication database DB1 accumulating information that can permit authentication, and permits the login of the user US0 when the second authentication information IN2 received from the image processing apparatus 200 via the network NE1 is registered in the authentication database DB1. Therefore, the processing portion U3 can execute authentication based on the second authentication information IN2 acquired by the acquisition portion U2.

Furthermore, when the acquisition portion U2 receives a print job registration request RE1 from the terminal 600 via the network NE1, the processing portion U3 generates the print job J0 according to the print job registration request RE1, and stores the print job J0 in association with the user US0. In addition, the processing portion U3 also holds screen information D0 for displaying screens such as the pre-login screen D1 illustrated in FIG. 5 and the function list screen D2 illustrated in FIG. 6 on the display portion 206 of the image processing apparatus 200. When the user US0 succeeds in authentication, the processing portion U3 transmits the screen information D0 according to the scene to the image processing apparatus 200.

Figure 3:
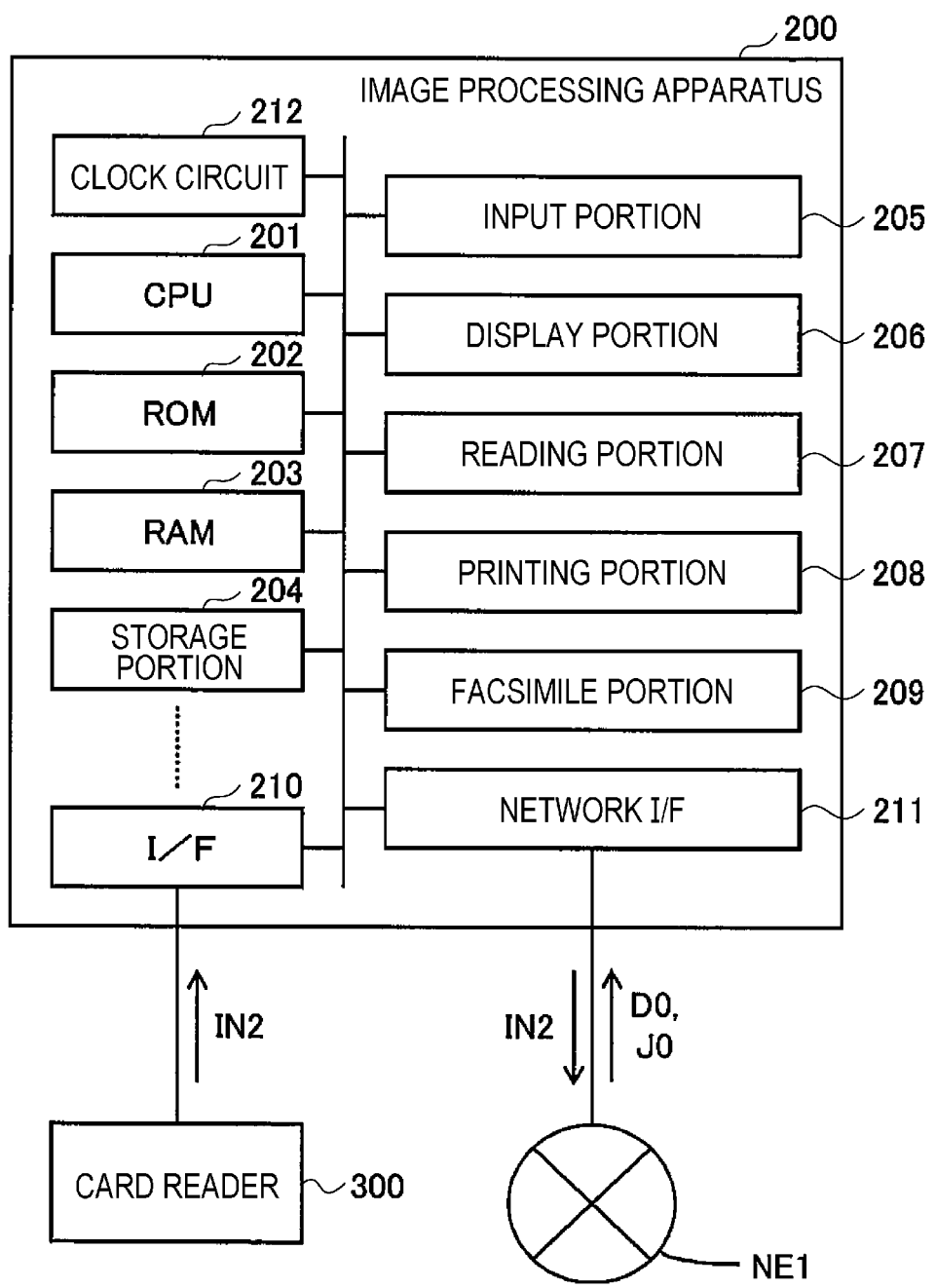
FIG. 3 is a block diagram schematically illustrating a configuration example of an image processing apparatus.

The image processing apparatus 200 is provided with an input portion 205, a display portion 206, a printing portion 208, an I/F 210 of the card reader 300, and the like. The image processing apparatus 200 may be a multifunction machine as illustrated in FIG. 3, or may be a dedicated printer, dedicated scanner, dedicated copy machine, dedicated facsimile machine, or the like. The multifunction machine can be said to be a printing device that includes functions other than a printing function. Functions other than the printing function include a document reading function, a copying function, a facsimile function, and the like.

When the second authentication information IN2 is acquired from the card reader 300, the image processing apparatus 200 transmits the second authentication information IN2 to the authentication printing server 100 via the network NE1. When the input portion 205 receives the input operation of the user name and the password as the second authentication information IN2, the image processing apparatus 200 transmits the second authentication information IN2 to the authentication printing server 100 via the network NE1. In addition, when the screen information D0 is received from the authentication printing server 100 via the network NE1, the image processing apparatus 200 displays a screen according to the screen information D0 on the display portion 206. Furthermore, when the print job J0 is received from the authentication printing server 100 via the network NE1, the image processing apparatus 200 executes printing in the printing portion 208 according to the print job J0.

When the ID card 350 in which the second authentication information IN2 is recorded in a computer-readable manner comes into contact with or is placed at a short distance, the card reader 300 reads the second authentication information IN2 from the ID card 350, and transmits the second authentication information IN2 to the image processing apparatus 200. The second authentication information IN2 recorded on the ID card 350 is associated with the user US0 who owns the ID card 350. An IC card, a magnetic card, a card on which an identification code including the second authentication information IN2 is printed, or the like can be used as the ID card 350. The identification codes include barcodes, two-dimensional codes, and the like. The ID holder 560 illustrated in FIG. 1 may be the ID card 350, or the ID holder 560 and the ID card 350 may be different. In addition, the second authentication information IN2 recorded on the ID card 350 may be the same information as the first authentication information IN1 held in the ID holder 560, or may be information different from the first authentication information IN1. The present technique is applied when the first authentication information IN1 and the second authentication information IN2 indicate the same user US0. The card reader 300 includes an IC card reader, a magnetic card reader, an identification code reader, and the like. The card reader 300 may have the function of a writer capable of writing information. The card reader 300 may be directly coupled to the authentication printing server 100 instead of the image processing apparatus 200, or may be connected to the network NE1 when having a function as a web server.

FIG. 2 schematically illustrates the configuration of an authentication printing server 100, which is an example of an information processing apparatus. The authentication printing server 100 is provided with a CPU 101 as a processor, a ROM 102 as a semiconductor memory, a RAM 103 as a semiconductor memory, a storage portion 104, an input device 105, a display device 106, a network I/F 107, a clock circuit 108, and the like. These elements are electrically coupled so that information can be input and output to and from each other.

The storage portion 104 stores an OS (not illustrated), a control program PR1, an authentication database DB1, screen information D0, a print job J0, and the like. Here, OS is an abbreviation for operating system. The storage portion 104 is a computer-readable medium recording the control program PR1. The control program PR1 may be recorded on a computer-readable external recording medium. The control program PR1 causes the authentication printing server 100 as a computer to realize an acquisition function FU2 for the entrance permission/refusal information IN4 and the like, and a processing function FU3 for permitting the user US0 to use the image processing apparatus 200. The acquisition function FU2 and network I/F 107 constitute the acquisition portion U2 illustrated in FIG. 1. The processing function FU3 corresponds to the processing portion U3. The print job J0 is stored on the storage portion 104 in association with the user US0. In the example illustrated in FIG. 2, it is indicated that the storage portion 104 stores a print job "J1" associated with a user "US1", a print job "J2" associated with a user "US2", and a print job "J3" associated with a user "US3".

A magnetic storage device such as a hard disk, a nonvolatile semiconductor memory such as a flash memory, or the like can be used for the storage portion 104.

A pointing device, a hard key including a keyboard, a touch panel attached to the surface of the display panel, or the like can be used for the input device 105. A liquid crystal display panel or the like can be used for the display device 106. The network I/F 107 is connected to the network NE1 and communicates with a counterpart device connected to the network NE1 according to a predetermined communication standard. For example, the network I/F 107 receives a print job registration request RE1, entrance permission/refusal information IN4, authentication success information IN3, second authentication information IN2, and the like from the counterpart device, and transmits the entrance permission/refusal inquiry RE2, the screen information D0, the print job J0 and the like to the counterpart device. The clock circuit 108 can output the current date and time.

The CPU 101 executes an acquisition processing corresponding to the acquisition function FU2 and a control processing corresponding to the processing function FU3 by executing the control program PR1 read from the storage portion 104 to the RAM 103. The control program PR1 causes the authentication printing server 100, which is a computer, to function as the acquisition portion U2 and the processing portion U3. The authentication printing server 100 executing the control program PR1 performs an acquisition step corresponding to the acquisition function FU2 and a control step corresponding to the processing function FU3.

FIG. 3 schematically illustrates the configuration of the image processing apparatus 200. The image processing apparatus 200 is provided with a CPU 201 as a processor, a ROM 202 as a semiconductor memory, a RAM 203 as a semiconductor memory, a storage portion 204, an input portion 205, a display portion 206, a reading portion 207, a printing portion 208, a facsimile portion 209, an I/F 210 of a card reader 300, a network I/F 211, a clock circuit 212, and the like. These elements are electrically coupled so that information can be input and output to and from each other.

The storage portion 204 stores firmware and the like. The CPU 201 causes the image processing apparatus 200 to realize a plurality of functions as the image processing apparatus 200 by executing the firmware read from the storage portion 204 to the RAM 203. These functions include a printing function, a reading function, a copying function, a facsimile function, and the like. A nonvolatile semiconductor memory such as a flash memory, a magnetic storage device such as a hard disk, or the like can be used for the storage portion 204.

A touch panel attached to the surface of the display panel, a hard key, or the like can be used for the input portion 205. A liquid crystal display panel or the like can be used for the display portion 206. The reading portion 207 reads a document and generates scan data representing a read image. The printing portion 208 executes printing on a printing paper based on the print job J0. The image processing apparatus 200 exhibits a copying function by reading a document with the reading portion 207 and printing the read image with the printing portion 208. The facsimile portion 209 facsimile-transmits an image read by the reading portion 207 to a transmission destination via a telephone line, and facsimile-receives an image from a transmission source via a telephone line. The image processing apparatus 200 can print the image received by the facsimile portion 209 with the printing portion 208. The I/F 210 is coupled to the card reader 300 and can receive the second authentication information IN2 from the card reader 300. The network I/F 211 is connected to the network NE1 and communicates with the authentication printing server 100 connected to the network NE1 according to a predetermined communication standard. For example, the network I/F 211 transmits second authentication information IN2 and the like to the authentication printing server 100 and receives screen information D0, a print job J0, and the like from the authentication printing server 100. The clock circuit 212 can output the current date and time.

(3) Specific Example of System Processing

FIG. 4 schematically illustrates the flow of processing performed by the processing system SY1 when face authentication of an authorized user who has entered the office 530 is performed. FIG. 4 illustrates print processing as an example of image processing of the image processing apparatus 200. Here, steps S102, S116, S120, and S126 correspond to the acquisition portion U2 and the acquisition function FU2. Steps S104, S106, S118, S122, and S128 correspond to the processing portion U3 and the processing function FU3. Hereinafter, the description of "step" may be omitted and the reference numeral of the step may be illustrated in parentheses.

First, the terminal 600 receives an operation to register the print job J0 from the user US0, and transmits a registration request for the print job J0, that is, a print job registration request RE1 illustrated in FIG. 1 to the authentication printing server 100 (S102). When the print job registration request RE1 is received from the terminal 600, the authentication printing server 100 generates the print job J0 based on the print job registration request RE1, and performs storage processing for storing the print job J0 on the storage portion 104 in association with the user US0 (S104).

Figure 5:
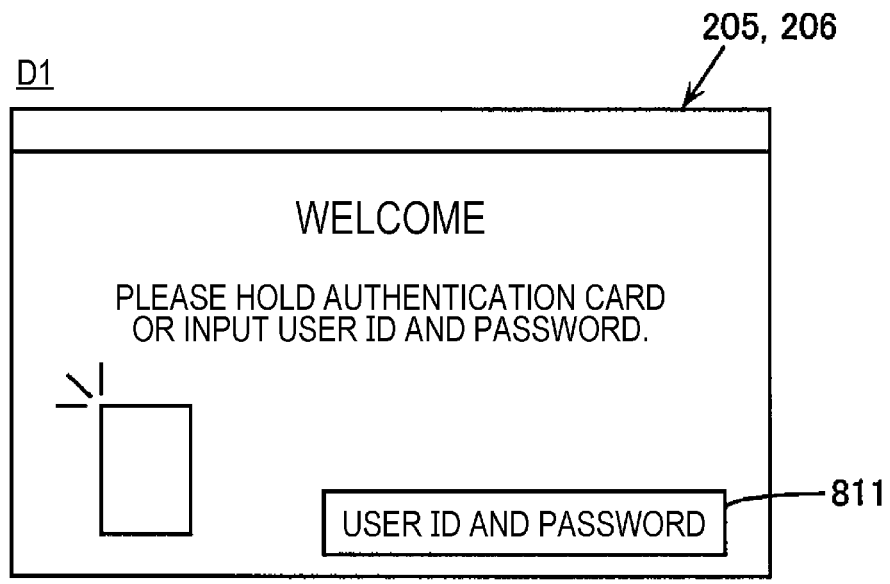
FIG. 5 is a diagram schematically illustrating a display example of a pre-login screen.

In addition, when the user US0 has not logged in, the authentication printing server 100 transmits to the image processing apparatus 200 pre-login screen information for displaying a pre-login screen D1 as illustrated in FIG. 5 on the display portion 206 (S106). When the pre-login screen information is received from the authentication printing server 100, the image processing apparatus 200 performs display processing for displaying the pre-login screen D1 on the display portion 206 provided with the input portion 205 on the surface (S108). The pre-login screen D1 illustrated in FIG. 5 has contents to prompt the user US0 to perform card authentication or input a user ID and a password. Since FIG. 4 illustrates processing when face authentication is performed, details of the pre-login screen D1 will be described later.

A user US0 outside the office 530 causes the outdoor reader 551 to read the first authentication information IN1 of the ID holder 560 as illustrated in FIG. 1 in order to go near the image processing apparatus 200. When the user US0 is authenticated based on the first authentication information IN1, the entrance/exit management server 500 received the first authentication information IN1 from the outdoor reader 551 allows the entrance/exit 540 to be opened to permit entrance of the user US0, and determines that the user US0 has entered the office 530 (S110).

When the face of the user US0 who has come near the image processing apparatus 200 is captured without contact, the imaging device 450 transmits the captured image IM1 to the face authentication server 400 (S112). When the captured image IM1 is received from the imaging device 450, the face authentication server 400 performs face authentication processing based on the captured image IM1 as the second authentication information IN2 (S114). When a feature amount having a degree of similarity to the feature amount of the face image included in the captured image IM1 greater than a threshold is registered in the face image database DB2, the face authentication server 400 generates authentication success information IN3 including information identifying the user US0, and transmits the authentication success information IN3 to the authentication printing server 100 (S116).

When the authentication success information IN3 is received from the face authentication server 400, the authentication printing server 100 transmits an entrance permission/refusal inquiry RE2 for the user US0 whose face authentication is performed to the entrance/exit management server 500 (S118). Since the entrance/exit determination result of the user US0 indicates the entrance, the entrance/exit management server 500 received the entrance permission/refusal inquiry RE2 generates entrance permission/refusal information IN4 indicating the entrance permission, and transmits the information to the authentication printing server 100 (S120). When the entrance permission/refusal information IN4 indicating the entrance permission is received, the authentication printing server 100 transmits function list screen information for displaying the function list screen D2 illustrated in FIG. 6 on the display portion 206 to the image processing apparatus 200 (S122). When the function list screen information is received from the authentication printing server 100, the image processing apparatus 200 performs display processing for displaying the function list screen D2 on the display portion 206 provided with the input portion 205 on the surface (S124).

Figure 6:
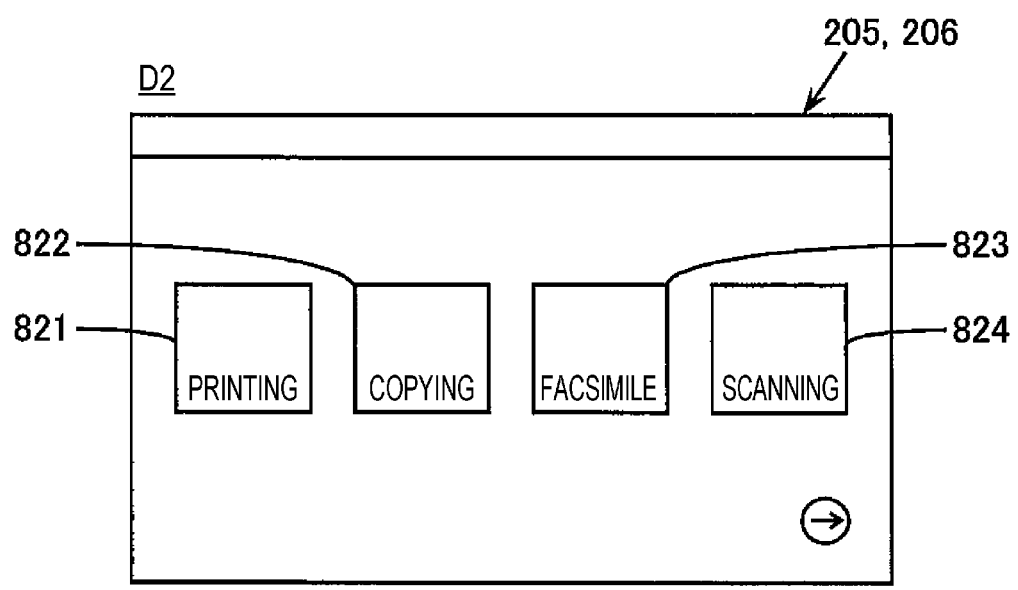
FIG. 6 is a diagram schematically illustrating a display example of a function list screen.

The function list screen D2 illustrated in FIG. 6 includes a printing button 821 for using the printing function, a copying button 822 for using the copying function, a facsimile button 823 for using the facsimile function, a scanning button 824 for using the reading function, and the like. The user US0 can use various functions of the image processing apparatus 200 by performing a touch operation on the function list screen D2. When the user US0 performs a touch operation for the printing button 821, the image processing apparatus 200 transmits a print instruction for the print job J0 associated with the user US0 to the authentication printing server 100 (S126). When the print instruction is received from the image processing apparatus 200, the authentication printing server 100 generates print data for executing printing based on the print job J0 associated with the user US0, and transmits the print data to the image processing apparatus 200 (S128). When the print data is received from the authentication printing server 100, the image processing apparatus 200 performs print processing for printing according to the print data (S130). As a result, printing based on the print job J0 is performed.

In addition, when the user US0 performs a touch operation for the copying button 822, the image processing apparatus 200 performs processing for copying the document. When the user US0 performs a touch operation for the facsimile button 823, the image processing apparatus 200 performs facsimile communication. When the user US0 performs a touch operation for the scanning button 824, the image processing apparatus 200 performs processing for reading the document. When a touch operation for a logout button (not illustrated) is performed on the image processing apparatus 200, the user US0 can log out from the authentication printing server 100.

Since the user US0 who has finished using the image processing apparatus 200 exits the office 530, the first authentication information IN1 on the ID holder 560 is read by the indoor reader 552. When the user US0 is authenticated based on the first authentication information IN1, the entrance/exit management server 500 received the first authentication information IN1 from the indoor reader 552 allows the entrance/exit 540 to be opened to permit exit of the user US0, and determines that the user US0 has exited the office 530 (S132).

In reality, there is a possibility that an unauthorized user succeeds in face authentication by using a face photo of an authorized user. As a result, there is a possibility that the unauthorized user illegally uses the image processing apparatus 200. Unauthorized authentication is not limited to face authentication, but can also occur in card authentication, authentication by input operation of a user ID and a password, and the like.

Therefore, the authentication printing server 100 of the present specific example permits login to the image processing apparatus 200 only when the user US0 is in the office 530. As a result, unauthorized use of the image processing apparatus 200 by an unauthorized user impersonating an authorized user who is not in the office 530 is suppressed.

Figure 7:
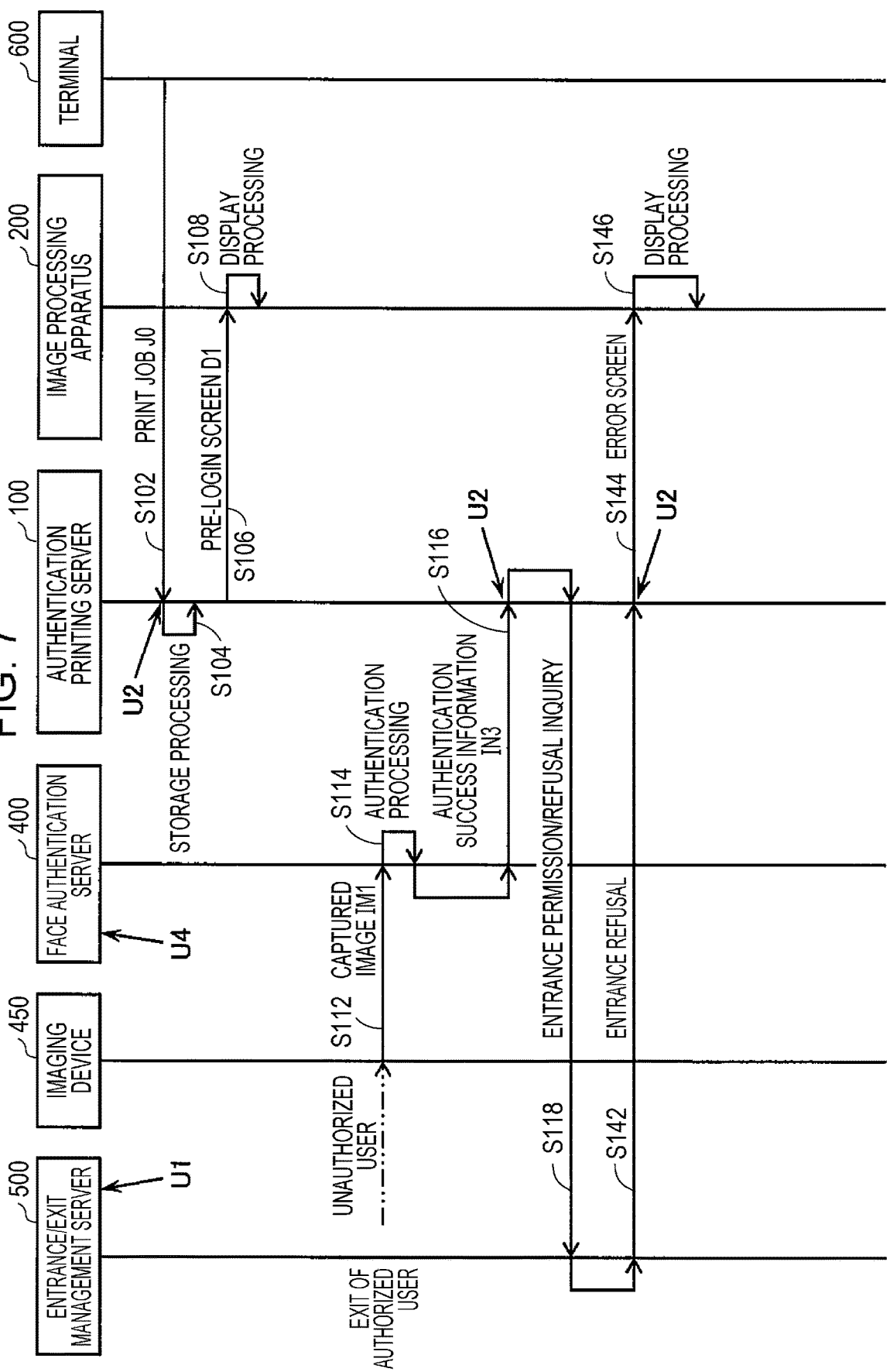
FIG. 7 is a diagram schematically illustrating an example of a flow of processing performed by the processing system when face authentication is performed for an unauthorized user who is outside the controlled area and is trying to impersonate an authorized user.

FIG. 7 schematically illustrates the flow of processing performed by the processing system SY1 when face authentication is performed for an unauthorized user who is outside the office 530 and is trying to impersonate an authorized user. FIG. 8 schematically illustrates processing performed by the processing portion U3 when face authentication is performed. In FIGS. 7 and 8, elements that are the same as those illustrated in FIG. 4 are labeled with the same reference numerals. Here, S142 corresponds to the acquisition portion U2 and the acquisition function FU2. S144 and S152 correspond to the processing portion U3 and the processing function FU3.

As illustrated in FIG. 7, when the unauthorized user holds the face photo of the authorized user over the imaging device 450, the imaging device 450 captures this face photo and transmits the captured image IM1 to the face authentication server 400 (S112). When the captured image IM1 is received from the imaging device 450, the face authentication server 400 performs face authentication processing based on the captured image IM1 as the second authentication information IN2 (S114). When a feature amount having a degree of similarity to the feature amount of the face image included in the captured image IM1 greater than a threshold is registered in the face image database DB2, the face authentication server 400 generates authentication success information IN3 including information identifying the authorized user, and transmits the authentication success information IN3 to the authentication printing server 100 (S116).

When the authentication success information IN3 is received from the face authentication server 400, the authentication printing server 100 transmits an entrance permission/refusal inquiry RE2 for the authorized user whose face authentication is performed to the entrance/exit management server 500 (S118). In the example illustrated in FIG. 7, no authorized user has entered the office 530. Since the entrance/exit determination result of the user US0 indicates the exit, the entrance/exit management server 500 received the entrance permission/refusal inquiry RE2 generates entrance permission/refusal information IN4 indicating the entrance refusal, and transmits the information to the authentication printing server 100 (S142). When the entrance permission/refusal information IN4 is received, the authentication printing server 100 causes the processing to branch according to whether the entrance permission/refusal information IN4 indicates the entrance permission or the entrance refusal (S152 in FIG. 8). When the entrance permission/refusal information IN4 indicates the entrance permission, the authentication printing server 100 permits the login of the user US0, and transmits the function list screen information to the image processing apparatus 200 as described above (S122 in FIG. 8).

When the entrance permission/refusal information IN4 indicates the entrance refusal, the authentication printing server 100 transmits to the image processing apparatus 200 error screen information for displaying an error screen D3 as illustrated in FIG. 8 on the display portion 206 (S144), and ends the processing illustrated in FIGS. 7 and 8. When the error screen information is received from the authentication printing server 100, the image processing apparatus 200 performs display processing for displaying the error screen D3 on the display portion 206 (S146 in FIG. 7). The error screen D3 illustrated in FIG. 8 indicates that the captured image IM1 as the second authentication information IN2 is an image in which face authentication can be succeeded, but face authentication has not been performed because there is a possibility of an illegal action.

As described above, when the entrance permission/refusal information IN4 indicates the entrance permission and the authentication success information IN3 indicating that the face authentication is performed based on the second authentication information IN2 is acquired, the processing portion U3 permits the user US0 to use the image processing apparatus 200. In this case, it is considered that the authorized user entered the office 530 and successfully performed face authentication in the office 530. On the other hand, when the entrance permission/refusal information IN4 indicates the entrance refusal, the processing portion U3 does not permit the user US0 to use the image processing apparatus 200 even when the authentication success information IN3 is acquired. Since an authorized user outside the office 530 cannot be successfully performed face authentication inside the office 530, when the entrance permission/refusal information IN4 indicates the entrance refusal, it is considered that the unauthorized user illegally succeeds in face authentication in the office 530. Therefore, the present specific example can enhance the effect of suppressing unauthorized use of the image processing apparatus 200.

As a matter of course, the effect of suppressing unauthorized use of the image processing apparatus 200 can also be obtained in the case of card authentication, authentication by input operation of the user ID and the password, and the like.

FIG. 9 schematically illustrates the flow of processing performed by the processing system SY1 when card authentication is performed for an unauthorized user who is outside the office 530 and is trying to impersonate an authorized user. FIG. 10 schematically illustrates processing performed by the processing portion U3 when card authentication is performed. In FIGS. 9 and 10, elements that are the same as those illustrated in FIGS. 7 and 8 are labeled with the same reference numerals. Here, S204 corresponds to the acquisition portion U2 and the acquisition function FU2. S206 corresponds to the processing portion U3 and the processing function FU3. Hereinafter, an example of suppressing unauthorized use of the image processing apparatus 200 in the case of card authentication will be described with reference to FIG. 5.

When the pre-login screen D1 illustrated in FIG. 5 is displayed on the display portion 206 of the image processing apparatus 200, if the user US0 performs an operation of holding the ID card 350 over the card reader 300, card authentication is performed. First, the card reader 300 reads the second authentication information IN2 including information identifying the user US0 from the ID card 350, and transmits the second authentication information IN2 to the image processing apparatus 200 (S202). As illustrated in FIG. 9, even when the unauthorized user illegally possesses the ID card 350 of the authorized user, the second authentication information IN2 of the authorized user is transmitted to the image processing apparatus 200. In addition, when the user US0 performs a touch operation for the "user ID and password" button 811 provided on the pre-login screen D1, the image processing apparatus 200 receives an operation from the user US0 to input the user ID and the password as the second authentication information IN2. Even when the unauthorized user performs an operation of inputting the user ID and the password of the authorized user, the operation is received.

When the second authentication information IN2 is received from the card reader 300, the image processing apparatus 200 transmits the second authentication information IN2 to the authentication printing server 100 and requests login of the user US0 (S204). In addition, when an operation of inputting the user ID and the password is received as the second authentication information IN2, the image processing apparatus 200 transmits the input second authentication information IN2 to the authentication printing server 100, and requests login of the user US0. When the second authentication information IN2 is received from the image processing apparatus 200, the authentication printing server 100 performs authentication processing based on the second authentication information IN2 (S206). The authentication printing server 100 determines that the user US0 can be authenticated when the second authentication information IN2 is registered in the authentication database DB1. When the authentication fails, the authentication printing server 100 ends the processing illustrated in FIGS. 9 and 10.

When the card authentication of the user US0 or the authentication by the input operation of the user ID and the password is performed, the authentication printing server 100 transmits the entrance permission/refusal inquiry RE2 for the authenticated authorized user to the entrance/exit management server 500 (S118). In the example illustrated in FIG. 9, no authorized user has entered the office 530. Since the entrance/exit determination result of the user US0 indicates the exit, the entrance/exit management server 500 received the entrance permission/refusal inquiry RE2 generates entrance permission/refusal information IN4 indicating the entrance refusal, and transmits the information to the authentication printing server 100 (S142). When the entrance permission/refusal information IN4 is received, the authentication printing server 100 causes the processing to branch according to whether the entrance permission/refusal information IN4 indicates the entrance permission or the entrance refusal (S152 in FIG. 10). When the entrance permission/refusal information IN4 indicates the entrance permission, the authentication printing server 100 permits the login of the user US0, and transmits the function list screen information to the image processing apparatus 200 as described above (S122 in FIG. 10).

When the entrance permission/refusal information IN4 indicates the entrance refusal, the authentication printing server 100 transmits to the image processing apparatus 200 error screen information for displaying an error screen D3 as illustrated in FIG. 10 on the display portion 206 (S144), and ends the processing illustrated in FIGS. 9 and 10. When the error screen information is received from the authentication printing server 100, the image processing apparatus 200 performs display processing for displaying the error screen D3 on the display portion 206 (S146 in FIG. 9). The error screen D3 includes a display indicating that login is refused, such as "login is not allowed!".

As described above, when the entrance permission/refusal information IN4 indicates the entrance permission and the authentication is performed based on the second authentication information IN2 acquired by the acquisition portion U2, the processing portion U3 permits the user US0 to use the image processing apparatus 200. In this case, it is considered that the authorized user entered the office 530 and successfully performed authentication in the office 530. On the other hand, when the entrance permission/refusal information IN4 indicates the entrance refusal, even if authentication can be performed based on the second authentication information IN2, the processing portion U3 does not permit the user US0 to use the image processing apparatus 200. Since an authorized user outside the office 530 cannot be successfully performed authentication inside the office 530, when the entrance permission/refusal information IN4 indicates the entrance refusal, it is considered that the unauthorized user illegally succeeds in authentication in the office 530. Therefore, the present specific example can enhance the effect of suppressing unauthorized use of the image processing apparatus 200.

(4) Modification Example

Various modification examples of the present disclosure are considered.

For example, the authentication printing server 100 may include an authentication portion U4 that performs authentication based on the second authentication information IN2 acquired from the user US0 in the office 530, for example, a face authentication portion that performs face authentication. In addition, the authentication printing server 100 may also include a determination portion U1 that determines whether or not to permit the user US0 to enter the office 530 based on the first authentication information IN1 acquired from the user US0.

The processing system SY1 may include a third authentication portion or the like that performs authentication based on third authentication information different from the first authentication information IN1 and the second authentication information IN2. When the processing system SY1 includes the third authentication portion or the like, the processing system SY1 may permit the user US0 to use the image processing apparatus 200 only when authentication is performed based on the first authentication information IN1, authentication is performed based on the second authentication information IN2, and authentication is performed based on the third authentication information.

The authentication based on the second authentication information IN2 may be iris authentication, fingerprint authentication, or the like.

The processing described above can be changed as appropriate, such as by changing the order. The above-described processing is not limited to the example executed by the CPU, and may be executed by an electronic component such as an ASIC. Here, ASIC is an abbreviation for Application Specific Integrated Circuit. In addition, the above-described processing may be distributed by a plurality of CPUs, or may be executed by cooperation between the CPU and electronic components such as ASIC.

The authentication printing server 100 may repeatedly transmit the entrance permission/refusal inquiry RE2 to the entrance/exit management server 500 and acquire the entrance permission/refusal information IN4 from the entrance/exit management server 500. When the entrance permission/refusal information IN4 indicates the entrance refusal, the authentication printing server 100 may ignore the authentication success information IN3 from the face authentication server 400, or may not perform authentication based on the second authentication information IN2. When the entrance permission/refusal information IN4 indicates the entrance permission, the authentication printing server 100 may permit the user US0 to use the image processing apparatus 200 when the authentication success information IN3 is received or authentication is performed based on the second authentication information IN2.

A plurality of image processing apparatuses 200 may be installed in the office 530 as illustrated in FIG. 11. FIG. 11 illustrates that an image processing apparatus 251 whose identification information is "MFP1", an image processing apparatus 252 whose identification information is "MFP2", and an image processing apparatus 253 whose identification information is "MFP3" are installed in the office 530. In addition, a plurality of imaging devices 450 may be installed in the office 530. FIG. 11 illustrates that an imaging device 451 that captures an image of the vicinity of the image processing apparatus 251, an imaging device 452 that captures an image near the image processing apparatus 252, and an imaging device 453 that captures an image of the vicinity of the image processing apparatus 253 are installed in the office 530.

In addition, as illustrated in FIG. 12, when the authentication success information IN3 is received from the face authentication server 400, the authentication printing server 100 may transmit to the terminal 600 the fact that authentication is performed based on the second authentication information IN2. FIG. 12 schematically illustrates another processing performed by the processing portion U3 when face authentication is performed. A terminal of a transmission destination may be any terminal that receives the operation by the user US0, and is not limited to the terminal 600 that transmits the print job registration request RE1.

In S116, the face authentication server 400 transmits the authentication success information IN3 to the authentication printing server 100 and the identification information of the image processing apparatus 200 for which face authentication is performed based on the captured image IM1 as the second authentication information IN2. For example, when face authentication is performed based on the captured image IM1 captured by the imaging device 452, the face authentication server 400 transmits the authentication success information IN3 and the identification information "MFP2" of the image processing apparatus 252 to the authentication printing server 100.

When the authentication success information IN3 and identification information of the image processing apparatus 200 are received from the face authentication server 400, the authentication printing server 100 transmits to the terminal 600 notification screen information for causing the terminal 600 to display a notification screen 651 as illustrated in FIG. 12 (S302). When the notification screen information is received from the authentication printing server 100, the terminal 600 displays a notification screen 651. The notification screen 651 includes a display indicating that face authentication is performed on the image processing apparatus 200 identified by the identification information based on the second authentication information IN2, such as "User authentication is performed on the MPF2". Regardless of whether the authorized user has entered the office 530 or not, when the authorized user is notified that face authentication is performed while the authorized user is not performing a login action, the authorized user can obtain the possibility of unauthorized login. As a result, it is possible to check the unauthorized user.

Thereafter, the authentication printing server 100 transmits the entrance permission/refusal inquiry RE2 for the user US0 whose face authentication is performed to the entrance/exit management server 500 (S118). When the entrance permission/refusal information IN4 indicating the entrance permission is received from the entrance/exit management server 500, the authentication printing server 100 causes the display portion 206 to display the function list screen D2 as illustrated in FIG. 6 (S122). When the entrance permission/refusal information IN4 indicating the entrance refusal is received from the entrance/exit management server 500, the authentication printing server 100 causes the display portion 206 to display an error screen D3 as illustrated in FIG. 8 (S144).

As described above, the example illustrated in FIG. 12 can further enhance the effect of suppressing unauthorized use of the image processing apparatus 200. As a matter of course, even when card authentication, authentication by input operation of the user name and the password, and the like are performed, similarly, the effect of suppressing unauthorized use of the image processing apparatus 200 can be further enhanced.

Incidentally, as illustrated in FIG. 11, the network NE1 may be connected to a management device 700 that receives an operation by an administrator AD0 who manages the image processing apparatus 200. The management device 700 is a server computer including a CPU 701, a ROM 702, a RAM 703, a storage portion 704, an I/F 705 for connecting to the network NE1, and the like. The storage portion 704 may accumulate the error information IN5 having a link destination L1 to the saved captured data IM3. Details of the error information IN5 will be described later.

The imaging device 450 may continuously capture images of the user US0 who is a target of which the second authentication information IN2 is to be acquired, and generate the captured data IM2. The captured data IM2 is assumed to be moving image data, but may be data of continuously captured images. FIG. 11 illustrates that the imaging device 451 generates captured data IM21, the imaging device 452 generates captured data IM22, and the imaging device 453 generates captured data IM23. A system including the processing system SY1 may be provided with a storage portion 104 that saves data of a predetermined period of the captured data IM2 acquired from the imaging device 450 as saved captured data IM3. The storage portion 104 illustrated in FIG. 11 is provided in the authentication printing server 100, and the storage portion for the saved captured data IM3 may be provided in any one of the imaging device 450, the entrance/exit management server 500, the face authentication server 400, the management device 700, the image processing apparatus 200, and the terminal 600.

As illustrated in FIG. 13, the authentication printing server 100 may notify the terminal 600 of the possibility of unauthorized login when the entrance permission/refusal information IN4 indicates the entrance refusal and authentication is performed based on the second authentication information IN2. In addition, the authentication printing server 100 may notify the management device 700 of the error information IN5 when the entrance permission/refusal information IN4 indicates the entrance refusal and authentication is performed based on the second authentication information IN2. Furthermore, the authentication printing server 100 may save the data of a predetermined period of the captured data IM2 in the storage portion 104 in a readable manner as the saved captured data IM3 when the entrance permission/refusal information IN4 indicates the entrance refusal and authentication is performed based on the second authentication information IN2. FIG. 13 schematically illustrates another processing performed by the processing portion U3 when face authentication is performed.

When the identification information of the image processing apparatus 200 and the authentication success information IN3 is received from the face authentication server 400, the authentication printing server 100 transmits the entrance permission/refusal inquiry RE2 of the user US0 whose face authentication is performed to the entrance/exit management server 500 (S118). When the entrance permission/refusal information IN4 indicating the entrance permission is received from the entrance/exit management server 500, the authentication printing server 100 causes the display portion 206 to display the function list screen D2 as illustrated in FIG. 6.

When the entrance permission/refusal information IN4 indicating the entrance refusal is received from the entrance/ exit management server 500, the authentication printing server 100 transmits to the terminal 600 notification screen information that causes the terminal 600 to display a notification screen 652 as illustrated in FIG. 13 (S312). When the notification screen information is received from the authentication printing server 100, the terminal 600 displays a notification screen 652. The notification screen 652 includes a display indicating that there is a possibility of unauthorized login to the image processing apparatus 200 identified by the identification information, such as "there is a possibility that an unauthorized user who is not in the office has attempted an unauthorized login to the MFP2!". When authentication is performed for the user US0 who is not permitted to enter the office 530 based on the second authentication information IN2, a possibility of unauthorized login is considered. Since the authorized user can obtain the possibility of such unauthorized login, the unauthorized user can be checked.

In addition, the authentication printing server 100 receives captured data IM2 from imaging device 450 that captures an image of the vicinity of the image processing apparatus 200 identified by the identification information, and saves the data of a predetermined period including the time point when the face authentication is performed of the captured data IM2 on the storage portion 104 as the saved captured data IM3 (S314). The above-described predetermined period can be a period from a predetermined time before face authentication to a predetermined time after face authentication, such as a period of five minutes before and after face authentication is performed. Since the captured data of the user US0 is saved on the storage portion when there is a possibility of unauthorized login, the unauthorized user can be checked.

Furthermore, the authentication printing server 100 transmits error information IN5 as illustrated in FIG. 13 to the management device 700 (S316), and ends the processing illustrated in FIG. 13. When the error information IN5 is received from the authentication printing server 100, the management device 700 displays a notification screen 751 including the error information IN5. The error information IN5 includes information that there is a possibility of unauthorized login to the image processing apparatus 200 identified by the identification information, such as "a user US3 who is not in the office has attempted to log in to the MFP2". In addition, the error information IN5 also has the link destination L1 to the saved captured data IM3. When the administrator AD0 operates the display area of the link destination L1, the management device 700 downloads the saved captured data IM3 from the storage portion 104 and displays the data. As a result, the administrator AD0 can view the saved captured data IM3 that may be captured by an unauthorized user.

As described above, since the error information IN5 is notified to the administrator AD0 when there is a possibility of unauthorized login, the unauthorized user can be checked.

Even when the processing of S314 and S316 are not performed when the processing of S312 illustrated in FIG. 13 is performed, the effect of suppressing unauthorized use of the image processing apparatus 200 can be further enhanced. Even when the processing of S312 and S316 are not performed when the processing of S314 illustrated in FIG. 13 is performed, the effect of suppressing unauthorized use of the image processing apparatus 200 can be further enhanced. Even when the error information IN5 does not include the link destination L1 and the processing of S312 and S314 are not performed when the processing of S316 illustrated in FIG. 13 is performed, the effect of suppressing unauthorized use of the image processing apparatus 200 can be further enhanced. As a matter of course, it is also possible to perform two processing without performing one processing of the processing of S312, S314, and S316.

As illustrated in FIG. 14, the processing system SY1 may not include the authentication printing server 100, and the image processing apparatus 200 may include the acquisition portion U2 and the processing portion U3. FIG. 14 schematically illustrates another configuration of a system including a processing system SY1. The system includes the image processing apparatus 200, the card reader 300, the face authentication server 400, the imaging device 450, the entrance/exit management server 500, and the terminal 600. The processing system SY1 includes the image processing apparatus 200 and the card reader 300. The image processing apparatus 200 includes the acquisition portion U2, the processing portion U3, and the like. The acquisition portion U2 includes I/F 210 of card reader 300 and network I/F 211. The network I/F 211 acquires authentication success information IN3 from the face authentication server 400. I/F 210 acquires second authentication information IN2 from the card reader 300. In addition, the acquisition portion U2 also receives an input operation of the user name and the password as second authentication information IN2 at the input portion 205. The processing portion U3 permits the user US0 to use the image processing apparatus 200 when the entrance permission/refusal information IN4 indicates the entrance permission and the authentication success information IN3 is acquired. In addition, when the entrance permission/refusal information IN4 indicates the entrance permission and the authentication is performed based on the second authentication information IN2 acquired by the acquisition portion U2, the processing portion U3 permits the user US0 to use the image processing apparatus 200.

As described above, the processing system SY1 illustrated in FIG. 14 can also enhance the effect of suppressing unauthorized use of the image processing apparatus 200. The image processing apparatus 200 may include the determination portion U1, may include the authentication portion U4, and may include a third authentication portion and the like.

(5) Conclusion

As described above, according to the present disclosure, it is possible to provide the technique and the like that enhance the effect of suppressing unauthorized use of the image processing apparatus 200 in various aspects. As a matter of course, the above-described basic actions and effects can be obtained even with a technique including only the constituent elements of the independent aspects.

In addition, a configuration in which each configuration disclosed in the above examples is replaced with each other or the combination thereof is changed, and a configuration in which each configuration disclosed in the known technique and the above examples is replaced with each other or the combination thereof is changed, and the like can also be performed. The present disclosure also includes these configurations and the like.

What is claimed is:

1. A processing system that permits a user who is authenticated to use an image processing apparatus installed in a controlled area, the processing system comprising:
a central processing unit (CPU) configured to:
acquire entrance permission/refusal information indicating whether or not there is entrance permission, wherein the entrance permission/refusal information is based on first authentication information associated with a first authentication, the first authentication information is acquired from the user, and indicates whether or not to permit entrance of the user to the controlled area, and the entrance permission indicates that the entrance to the controlled area is permitted;

acquire second authentication information associated with a second authentication, wherein the second authentication information is acquired from the user in the controlled area;

permit, in a case where the second authentication based on the second authentication information is a success and the entrance permission/refusal information indicates entrance permission, the user to use the image processing apparatus; and refuse, in a case where the second authentication is a success based on the second authentication information and the entrance permission/refusal information indicates entrance refusal, the user to use the image processing apparatus, wherein the entrance permission/refusal information indicates entrance refusal in a case where the user has exited the controlled area.

2. The processing system according to claim 1, wherein the CPU is further configured to acquire authentication success information indicating that the first authentication is performed from an authentication portion that performs the second authentication based on the second authentication information acquired from the user in the controlled area, and when the entrance permission/refusal information indicates entrance permission and the authentication success information is acquired, the CPU is further configured to permit the user to use the image processing apparatus.

3. The processing system according to claim 1, wherein when the second authentication is performed based on the second authentication information, the CPU is further configured to perform processing for notifying a terminal that receives an operation by the user that the second authentication is performed based on the second authentication information.

4. The processing system according to claim 1, wherein when the entrance permission/refusal information indicates entrance refusal rather than entrance permission and the second authentication is performed based on the second authentication information, the CPU is further configured to perform processing for notifying a terminal that receives an operation by the user of a possibility of unauthorized login.

5. The processing system according to claim 1, wherein when the entrance permission/refusal information indicates entrance refusal rather than entrance permission and the second authentication is performed based on the second authentication information, the CPU is further configured to perform processing for notifying a management device that receives an operation by an administrator of error information.

6. The processing system according to claim 1, wherein when the entrance permission/refusal information indicates entrance refusal rather than entrance permission and the second authentication is performed based on the second authentication information, the CPU is further configured to save, on a storage in a readable manner, data of a predetermined period including a time point when the second authentication is performed among captured data acquired from an imaging device that continuously captures an image of the user who is a target of which the second authentication information is to be acquired.

7. The processing system according to claim 1, wherein the CPU is further configured to cause the image processing apparatus to execute image processing via a network.

8. The processing system according to claim 1, wherein the CPU is included in the image processing apparatus.

9. An information processing apparatus that is coupled to an image processing apparatus installed in a controlled area and permits a user who is authenticated to use the image processing apparatus, the information processing apparatus comprising:

a central processing unit (CPU) configured to:

acquire entrance permission/refusal information indicating whether or not there is entrance permissions, wherein the entrance permission/refusal information is based on first authentication information associated with a first authentication, the first authentication information is acquired from the user, and indicates whether or not to permit entrance of the user to the controlled area, and the entrance permission indicates that the entrance to the controlled area is permitted;

acquire second authentication information associated with a second authentication, wherein the second authentication information is acquired from the user in the controlled area;

permit, in a case where the second authentication based on the second authentication information is a success and the entrance permission/refusal information indicates entrance permission, the user to use the image processing apparatus; and refuse, in a case where the second authentication is a success based on the second authentication information and the entrance permission/refusal information indicates entrance refusal, the user to use the image processing apparatus, wherein the entrance permission/refusal information indicates entrance refusal in a case where the user has exited the controlled area.

10. A non-transitory computer-readable storage medium storing a control program for permitting a user who is authenticated to use an image processing apparatus installed in a controlled area, the control program causing a computer to execute operations, the operation comprising:

acquiring entrance permission/refusal information indicating whether or not there is entrance permission, wherein the entrance permission/refusal information is based on first authentication information associated with a first authentication, the first authentication information is acquired from the user, and indicates whether or not to permit entrance of the user to the controlled area, and the entrance permission indicates that the entrance to the controlled area is permitted;

acquiring second authentication information associated with a second authentication, wherein the second authentication information is acquired from the user in the controlled area;

permitting, in a case where the second authentication based on the second authentication information is a success and the entrance permission/refusal information indicates entrance permission, the user to use the image processing apparatus; and refusing, in a case where the second authentication is a success based on the second authentication information and the entrance permission/refusal information indicates entrance refusal, the user to use the image processing apparatus, wherein
the entrance permission/refusal information indicates entrance refusal in a case where the user has exited the controlled area.

11. An image processing apparatus that is installed in a controlled area and permits use of a user who is authenticated, the image processing apparatus comprising:
a central processing unit (CPU) configured to:
acquire entrance permission/refusal information indicating whether or not there is entrance permission, wherein
the entrance permission/refusal information is based on first authentication information associated with a first authentication,
the first authentication information is acquired from the user, and indicates whether or not to permit entrance of the user to the controlled area, and the entrance permission indicates that the entrance to the controlled area is permitted;

acquire second authentication information associated with a second authentication, wherein the second authentication information is acquired from the user in the controlled area;

permit, in a case where the second authentication based on the second authentication information is a success and the entrance permission/refusal information indicates entrance permission, the user to use the image processing apparatus; and refuse, in a case where the second authentication is a success based on the second authentication information and the entrance permission/refusal information indicates entrance refusal, the user to use the image processing apparatus, wherein
the entrance permission/refusal information indicates entrance refusal in a case where the user has exited the controlled area.

* * * * *